United States Patent
Jang et al.

(10) Patent No.: US 11,654,570 B2
(45) Date of Patent: May 23, 2023

(54) SELF-DRIVING ROBOT AND METHOD OF OPERATING SAME

(71) Applicant: LG ELECTRONICS INC., Seoul (KR)

(72) Inventors: Yujune Jang, Seoul (KR); Hyoungmi Kim, Seoul (KR); Jeongeun Choi, Seoul (KR); Sunghee Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 16/870,515

(22) Filed: May 8, 2020

(65) Prior Publication Data

US 2021/0197387 A1    Jul. 1, 2021

(30) Foreign Application Priority Data

Dec. 27, 2019 (KR) ................. 10-2019-0176472

(51) Int. Cl.
*B25J 9/16* (2006.01)

(52) U.S. Cl.
CPC .................. *B25J 9/1694* (2013.01)

(58) Field of Classification Search
CPC ........ B25J 9/1694; B25J 11/008; B25J 9/161; B25J 9/1674; B25J 9/1679; B25J 9/1664; B25J 9/162; B25J 9/1666; B25J 11/0045; B25J 13/006; B25J 13/089; G06Q 10/083; G06Q 50/28; G06Q 10/08; G05D 1/0214
See application file for complete search history.

(56) References Cited

U.S. PATENT DOCUMENTS

| 10,303,171 | B1 * | 5/2019 | Brady .................. G05D 1/0297 |
| 11,099,562 | B1 * | 8/2021 | Ebrahimi Afrouzi ....................... G05D 1/0225 |
| 11,222,299 | B1 * | 1/2022 | Baalke ................. G06Q 10/087 |
| 11,224,967 | B1 * | 1/2022 | Lin ........................ H04W 4/029 |
| 11,232,394 | B1 * | 1/2022 | Pinette .................. G06N 20/00 |
| 2018/0130159 | A1 * | 5/2018 | High ................. G07C 9/00896 |
| 2020/0223632 | A1 * | 7/2020 | Melanson ............... G06F 21/33 |
| 2020/0316777 | A1 * | 10/2020 | Liivik .................... G06Q 50/30 |
| 2021/0241224 | A1 * | 8/2021 | Taniguchi ............... G08G 1/00 |

* cited by examiner

*Primary Examiner* — Abby Y Lin
*Assistant Examiner* — Esvinder Singh
(74) *Attorney, Agent, or Firm* — Ked & Associates, LLP

(57) ABSTRACT

The self-driving robot comprises: a loading box including at least one loading space; a communication circuit configured to transmit or receive a signal; an information collection device configured to detect a surrounding environment; a driving device configured to implement movement of the self-driving robot; and a processor configured to control the loading box, the communication circuit, and the information collection device, wherein the processor performs control so that the self-driving robot identifies delivery authority information and position information of an event operator, in response to detecting a delivery event while moving along a moving path, and the self-driving robot determines whether to open the loading box, on the basis of the delivery authority information and the position information.

18 Claims, 13 Drawing Sheets

SELF-DRIVING ROBOT AND METHOD OF OPERATING SAME

CROSS-REFERENCE TO RELATED APPLICATION

This application claims priority under 35 U.S.C. § 119 to Korean Application No. 10-2019-0176472 filed on Dec. 27, 2019, whose entire disclosure is hereby incorporated by reference. This application is related to U.S. application Ser. No. 16/849,165, filed Apr. 15, 2020, whose entire disclosure is also hereby incorporated by reference.

BACKGROUND

1. Field

Embodiments of the present disclosure relate to a self-driving robot and a method of operating the same.

2. Background

In general, a self-driving robot refers to a robot that is capable of autonomously moving without signals and power supplied from the outside because a power source and a sensor are provided within a body of the robot. The self-driving robot can handle a variety of tasks, such as cleaning services in buildings, security services for guarding the inside of the building, and the like.

In addition, the self-driving robot is used to provide a delivery service for transporting packages at various locations. Such a delivery service may be provided by a series of procedures in which that the self-driving robot loads a delivery package therein and transports the loaded package to a particular delivery point.

However, the delivery service using the self-driving robot has problems that a location at which the self-driving robot is capable of receiving or giving a package is restricted to a pre-designated delivery point, and for this reason, the self-driving robot in unable to take over or hand over a package at any location other than the pre-designated delivery point. In addition, in the case where the package is transported to the delivery point when a recipient is absent, a problem may occur that the transported package is received by someone other than the recipient or is lost.

The foregoing is intended merely to aid in the understanding of the background of the present disclosure, and is not intended to mean that the present disclosure falls within the purview of the related art that is already known to those skilled in the art.

BRIEF DESCRIPTION OF THE DRAWINGS

The embodiments will be described in detail with reference to the following drawings in which like reference numerals refer to like elements wherein.

DETAILED DESCRIPTION

Figure 1:
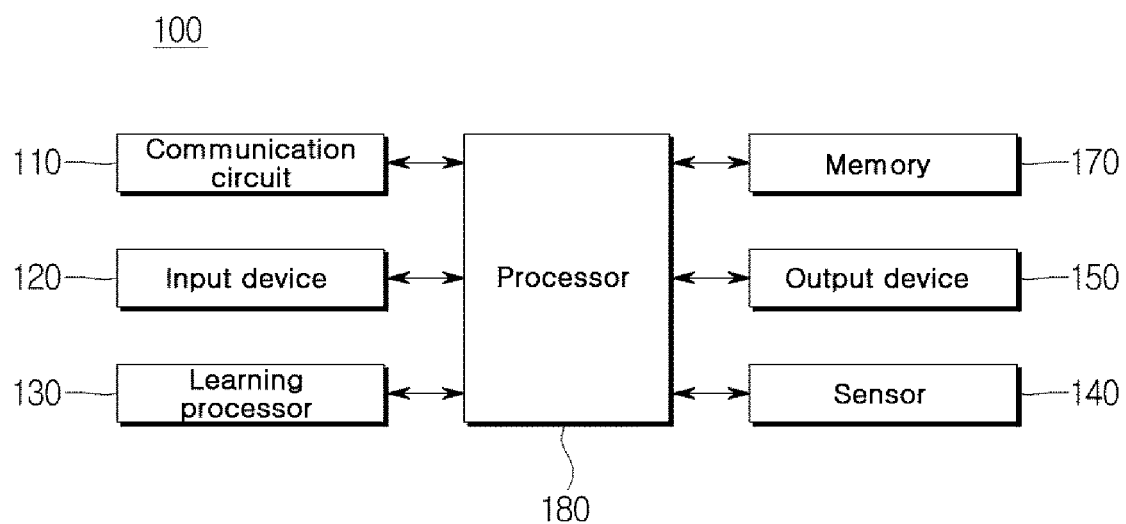
FIG. 1 is a view showing an AI apparatus according to an embodiment of the present disclosure.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, configured with artificial neurons (nodes) constituting a network in a synapse coupling, and means a model with problem solving ability. The artificial neural network may be defined by a connection pattern between neurons of other layers, a learning process of updating a model parameter, and an activation function generating an output value.

The artificial neural network may include an input layer, an output layer, and at least one selective hidden layer. Each layer may include at least one neuron, and the artificial neural network may include a synapse that connects neurons. In the artificial neural network, each neuron may output input signals input through a synapse, weights, and a function value of an activation function for a bias.

The model parameter means a parameter determined through learning, and includes a weight of a synapse connection, a bias of a neuron, etc. In addition, a hyper-parameter means a parameter that has to be set before performing learning in a machine learning algorithm, and includes a learning rate, a number of repetition times, a size of a mini-batch, an initialization function, etc.

An objective of performing learning for an artificial neural network is to determine a model parameter that minimizes a loss function. The loss function may be used as an index for determining an optimum model parameter in a learning process of the artificial neural network.

Machine learning may be classified into supervised learning, unsupervised learning, and reinforcement learning according to a learning method. Supervised learning may mean a method of performing learning for an artificial neural network where a label related to learning data is provided, and the label may mean a right answer (or result value) that has to be estimated by the artificial neural network when the learning data is input to the artificial neural network. Unsupervised learning may mean a method of performing learning for an artificial neural network where a label related to learning data is not provided. Reinforcement learning may mean a learning method performing learning so as to select, by an agent defined under a certain environment, an action or an order thereof such that an accumulated reward in each state is maximized.

Machine learning, among artificial neural networks, employed in a deep neural network (DNN) including a plurality of hidden layers, is referred to as deep learning, and the deep learning is a part of the machine learning. Hereinafter, machine learning is used to include deep learning.

A robot may mean a machine capable of automatically carrying out or operating a given operation by its own ability. Particularly, a robot having a function of recognizing an environment, and performing an operation by performing determination by itself may be referred to as an intelligent robot. A robot may be classified into an industrial type, a medical type, a household type, a military type, etc. according to the usage purpose or field.

The robot may be provided with a manipulator including an actuator or a driving device so that the robot may perform various physical operations such as moving a robot joint, and so on. In addition, a movable robot may navigate on the ground or fly in the air by including wheels, brakes and propellers, etc.

Self-driving means the technology of autonomous driving, and a self-driving vehicle means a vehicle that drives without user's manipulations or with the minimum manipulation of the user. For example, self-driving may include the technique of maintaining a driving lane, the technique of automatically adjusting a speed such as adaptive cruise control, the technique of automatically driving along a predetermined route, the technique of automatically setting a route when a destination is set, etc.

Vehicles may include a vehicle with only an internal combustion engine, a hybrid vehicle with an internal combustion engine and an electric motor together, and an electric vehicle with only an electric motor, and may include not only automobiles but also trains and motorcycles. Herein, a self-driving vehicle may be referred to as a robot with a self-driving function.

Extended reality refers to virtual reality (VR), augmented reality (AR), and mixed reality (MR). The VR technique provides objects and backgrounds of the real world in CG images, the AR technique provides virtual CG images by reflecting the same on real object images, and the MR technique is a computer graphic technique mixing and coupling virtual objects and providing by reflecting the same in the real word.

The MR technique is similar to the AR technique in that real objects and virtual objects are provided together. In the AR technique, virtual objects are used to complement real objects, but in the MR technique, virtual objects and real objects are equivalently used.

The XR technique may be applied by using a head-mount display (HMD), a head-up display (HUD), a mobile phone, a tablet PC, a laptop PC, a desktop PC, a TV, a digital signage, etc., and a device to which the XR technique is applied may be referred to an XR device.

FIG. 1 is a view showing an artificial intelligence (AI) apparatus 100 according to an embodiment of the present disclosure. The AI apparatus 100 may be employed in a fixed or movable type device such as TVs, projectors, mobile phones, smart phones, desktop PCs, laptop PCs, digital broadcasting terminals, PDAs (personal digital assistants), PMPs (portable multimedia player), navigations, tablet PCs, wearable devices, set-top boxes (STB), DMB receiver, radios, washers, refrigerators, digital signages, robots, vehicles, etc.

Referring to FIG. 1, the AI apparatus 100 may include a communication circuit 110, an input device 120, a learning processor 130, a sensor 140, an output device 150, a memory 170, and a processor 180. The communication circuit 110 may transmit and receive data to/from another AI apparatuses (100a to 100e) or external devices such as an AI server 200 by using wired/wireless communication methods. For example, the communication circuit 110 may transmit and receive sensor information, user input, learning model, control signals, etc. to/from external devices.

Herein, communication methods used by the communication circuit 110 include global system for mobile communication (GSM)), code division multi access (CDMA), long term evolution (LTE), 5G, wireless LAN (WLAN), wireless-fidelity (Wi-Fi), Bluetooth™, radio frequency identification (RFID), infrared data association (IrDA), ZigBee, near field communication (NFC), etc.

The input device 120 may be for obtaining various types of data. Herein, the input device 120 may include a camera for an image signal input, a microphone for receiving audio signals, and a user input part for receiving information from the user. Herein, signals obtained from the camera or microphone by using the same as sensors may be referred to as sensing data or sensor information.

The input device 120 may be for obtaining input data used for outputting that is performed by using learning data and a learning model for model learning. The input device 120 may be for obtaining input data that is not processed. Herein, the processor 180 or learning processor 130 may obtain an input feature from input data as preprocessing.

The learning processor 130 may perform learning for a model configured with an artificial neural network by using learning data. Herein, the artificial neural network for which learning is performed may be referred to as a learning model. The learning model may be used for estimating a result value for new input data other than learning data, and the estimated value may be used as a reference for performing a certain operation.

Herein, the learning processor 130 may perform AI processing with a learning processor 240 of the AI server 200. Herein, the learning processor 130 may be integrated in the AI apparatus 100 or may include a memory employed therein. Alternatively, the learning processor 130 may be employed by using the memory 170, an external memory directly connected to the AI apparatus 100, or a memory maintained in an external device.

The sensor 140 may obtain at least one among internal information of the AI apparatus 100, surrounding environmental information of the AI apparatus 100, and user information by using various sensors. Herein, the sensor 140 may include a proximity sensor, an ambient light sensor, an acceleration sensor, a magnetic sensor, a gyro sensor, an inertial sensor, an RGB sensor, an IR sensor, a fingerprint recognizing sensor, a ultrasonic sensor, an optical sensor, a microphone, a lidar, a radar, etc.

The output device 150 may generate an output related to visual, auditory, or tactile. Herein, the output device 150 may include a display for visually outputting information, a speaker for acoustically outputting information, and a haptic actuator for tactually outputting information. For example, the display may output an image or video, the speaker may output a voice or sound, and the haptic actuator may output vibration.

The memory 170 may be for storing data supporting various functions of the AI apparatus 100. For example, in the memory 170, input data obtained through the input device 120, learning data, a learning model, a learning history, etc. may be stored.

The processor 180 may determine at least one executable operation of the AI apparatus 100 which is determined on the basis of information determined or generated by using a data analysis algorithm or machine learning algorithm. In addition, the processor 180 may perform the determined operation by controlling components of the AI apparatus 100.

For the same, the processor 180 may make a request, retrieve, receive, or use data of the learning processor 130 or the memory 170, and control components of the AI apparatus 100 so as to perform the estimated operation of the at least one executable operation, or an operation that is determined to be desirable. Herein, in order to perform the determined operation, the processor 180 may generate, when association with an external device is required, a control signal for controlling the corresponding external device, and transmit the generated control signal to the corresponding external device.

The processor 180 may obtain intention information on the user's input, and determine a user's requirement on the basis of the obtained intention information. Herein, the processor 180 may obtain intention information in association with the user's input by using at least one among a STT (speech-to-text) engine converting a voice input into text strings, and a natural language processing (NLP) engine obtaining intention information of natural language.

Herein, a part of the at least one among the STT engine and the NLP engine may be configured with an artificial neural network for which learning is performed according to a machine learning algorithm. In addition, for at least one among the STT engine and the NLP engine, learning may be performed by the learning processor 130, learning may be is performed by the learning processor 240 of the AI server 200, or learning may be performed through distribution processing of the above processors.

The processor 180 may collect record information including operation content of the AI apparatus 100 and user's feedback in association with the operation, etc. so as to store in the memory 170 or learning processor 130, or transmit the information to the external device such as an AI server 200, etc. The collected record information may be used when updating a learning model.

The processor 180 may control a part of components of the AI apparatus 100 so as to execute application programs stored in the memory 170. Further, the processor 180 may operate components of the AI apparatus 100 by combining at least two thereof so as to execute the application programs.

Figure 2:
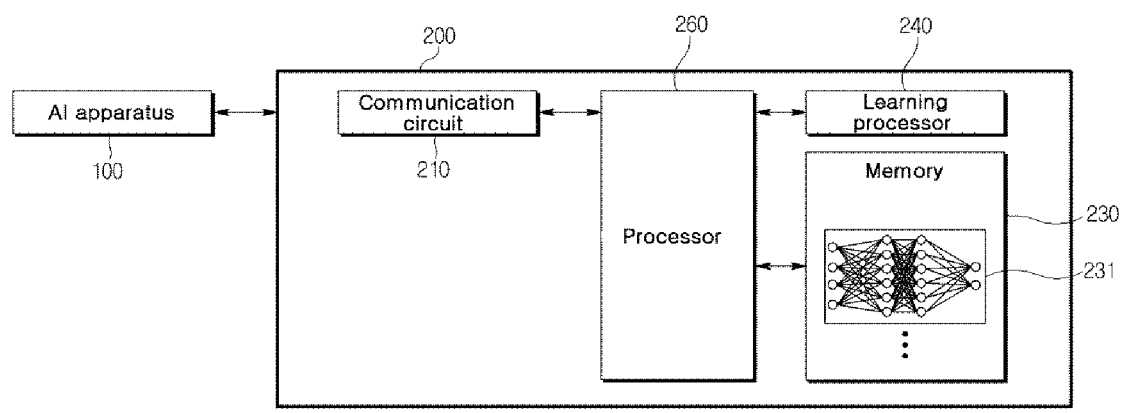
FIG. 2 is a view showing an AI server according to an embodiment of the present disclosure.

FIG. 2 is a view showing an AI server 200 according to an embodiment of the present disclosure. Referring to FIG. 2, an AI server 200 may mean a device performing learning for an artificial neural network by using a machine learning algorithm, or a device using the artificial neural network for which learning is performed. Herein, the AI server 200 may perform distributed processing by being configured with a plurality of servers, or may be defined as a 5G network. Herein, the AI server 200 may perform at least a part of AI processing by being included as a partial component of the AI apparatus 100.

Herein, the AI server 200 may perform at least a part of AI processing by being included as a partial component of the AI apparatus 100. The communication circuit 210 may transmit and receive data to/from the external devices such as AI apparatus 100, etc. The memory 230 may be for storing a model (or artificial neural network, 231) for which learning is ongoing or performed by the learning processor 240.

The learning processor 240 may perform learning for an artificial neural network 231a by using learning data. A learning model may be used by being integrated in the AI server 200 of the artificial neural network, or by being integrated in the external device such as an AI apparatus 100, etc. The learning model may be employed in hardware, software, or combination thereof. When a part or the entire of the learning model is employed in software, at least one instruction constituting the learning model may be stored in the memory 230. The processor 260 may estimate a result value for new input data by using the learning model, and generate a response or control command on the basis of the estimated result value.

Figure 3:
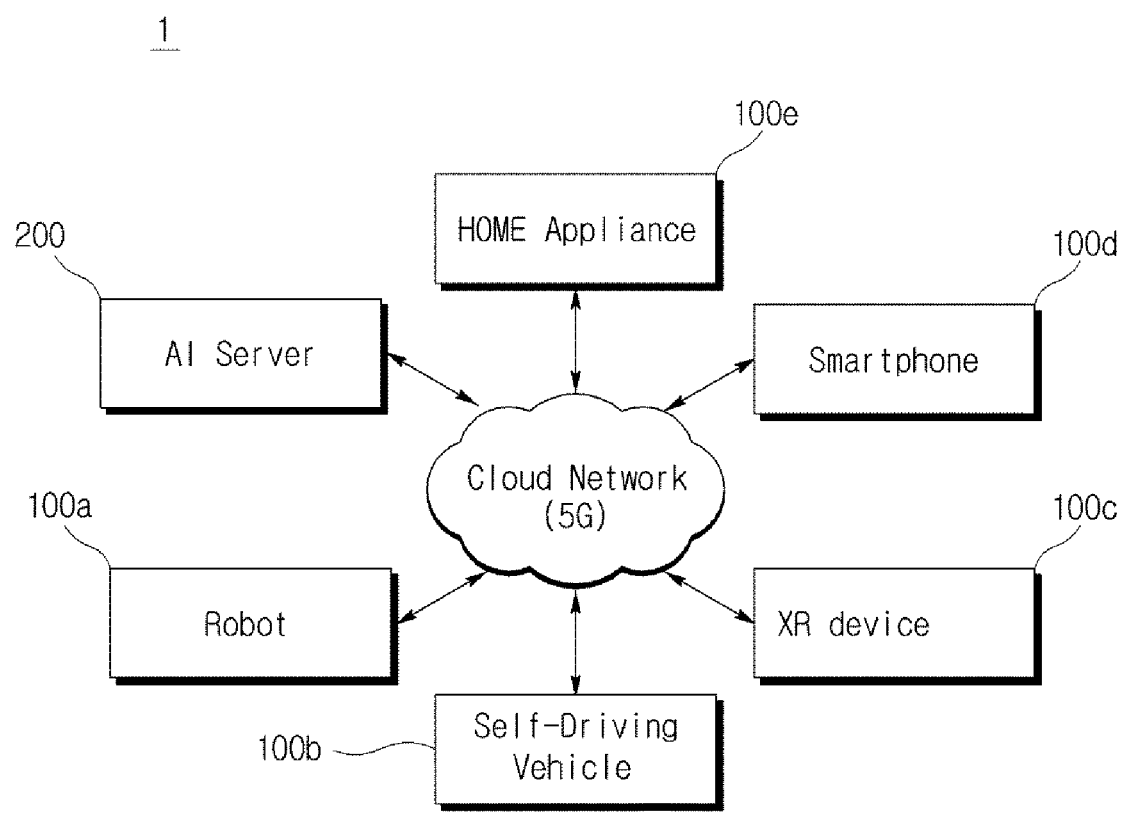
FIG. 3 is a view showing an AI system according to an embodiment of the present disclosure.

FIG. 3 is a view showing an AI system 1 according to an embodiment of the present disclosure. Referring to FIG. 3, the AI system 1 is connected to at least one cloud network 10 among the AI server 200, a robot 100a, self-driving vehicle 100b, an XR device 100c, a smart phone 100d, and a home appliance 100e. Herein, the robot 100a, the self-driving vehicle 100b, the XR device 100c, the smart phone 100d or the home appliance 100e to which the AI technique is applied may be referred to as the AI apparatus (100a to 100e).

The cloud network 10 may mean a network constituting a part of cloud computing infrastructure or a network present in the cloud computing infrastructure. Herein, the cloud network 10 may be configured by using a 3G network, a 4G or LTE network, a 5G network, etc. In other words, each device (100a to 100e, 200) constituting the AI system 1 may be connected with each other through the cloud network 10. Particularly, each device (100a to 100e, 200) may perform communication with each other through a base station, and also may perform direct communication without using the base station.

The AI server 200 may include a server performing AI processing, and a server performing calculation for big data. The AI server 200 may be connected to at least one among AI apparatus constituting an AI system 1 configured with the robot 100a, the self-driving vehicle 100b, the XR device 100c, the smart phone 100d, and the home appliance 100e through the cloud network 10, and the AI server 200 may support a part of the AI processing of the connected AI apparatuses (100a to 100e).

Herein, the AI server 200 may perform learning on an artificial neural network according to a machine learning algorithm in place of the AI apparatus (100a to 100e), may directly store a learning model, or transmit the learning model to the AI apparatus (100a to 100e). Herein, the AI server 200 may receive input data from the AI apparatus (100a to 100e), estimate a result value for the received input data by using a learning model, and generate a response or control command on the basis of the estimated result value so as to transmit the same to the AI apparatus (100a to 100e). Alternatively, the AI apparatus (100a to 100e) may estimate a result value for the received input data by directly using a learning model, and generate a response or control command on the basis of the estimated result value.

Hereinafter, various examples of the AI apparatus (100a to 100e) to which the above described technique is applied will be described. Herein, the AI apparatus (100a to 100e)

shown in FIG. 3 may be referred to a detailed example of the AI apparatus 100 shown in FIG. 1. The robot 100a may be employed in a guide robot, a transport robot, a cleaning robot, a wearable robot, an entertainment robot, a pet robot, an unmanned flying robot, etc. by applying the AI technique thereto.

The robot 100a may include a robot control module for controlling operations, and the robot control module may mean a software module or a chip where the same is employed therein. The robot 100a may obtain state information of the robot 100a, detect (recognize) a surrounding environment or objects, generate map data, determine a moving path or driving plan, determine a response in association with a user interaction, or determine operations by using sensor information that is obtained through various types of sensors.

Herein, in order to determine a moving path or driving plan, the robot 100a may use sensor information obtained by using at least one sensor of a lidar, a radar, and a camera. The robot 100a may perform the above operations by using a learning model configured with at least one artificial neural network. For example, the robot 100a may recognize a surrounding environment and objects by using a learning model, and determine operations by using the recognized surrounding environment information or object information. Herein, the learning model may be obtained by directly performing learning by the robot 100a, or by performing learning by the external device such as an AI server 200, etc.

Herein, the robot 100a may generate a result by directly using the learning model so as to perform operations. However, the robot 100a may transmit the sensor information to the external device such as an AI server 200, and receive a result generated according thereto so as to perform operations.

The robot 100a may determine a moving path and a driving plan by using at least one among map data, object information detected from the sensor information, and object information obtained from the external device, and drive according to the determined moving path and the driving plan by controlling a driving part.

Map data may include object identification information on various objects arranged in a space where the robot 100a moves. For example, the map data may include object identification information on fixed objects such as walls, doors, etc., and movable objects such as flowerpots, tables, etc. In addition, the object identification information may include a name, a type, a distance, a position, etc.

In addition, the robot 100a may perform operations or drive by controlling the driving part on the basis of the user's control/interaction. Herein, the robot 100a may obtain intention information on interaction according to a user's behavior or voice input, and determine a response on the basis of the obtained intention information so as to perform operations.

The self-driving vehicle 100b may be employed as a movable robot, a vehicle, an unmanned flying robot, etc. by applying the AI technique thereto. The self-driving vehicle 100b may include a self-driving control module controlling a self-driving function, and the self-driving control module may mean a software module or a chip where the same is employed in hardware. The self-driving control module may be included in the self-driving vehicle 100b as a component thereof, but may be connected to the self-driving vehicle 100b by being configured in separate hardware.

The self-driving vehicle 100b may obtain state information of the self-driving vehicle 100b, detect (recognize) a surrounding environment and objects, generate map data, determine a moving path and a driving plan, or determine operations by using sensor information obtained through various types of sensors.

Herein, in order to determine a moving path or driving plan, the self-driving vehicle 100b, similar to the robot 100a, may use sensor information obtained by using at least one sensor of a lidar, a radar, and a camera. Particularly, the self-driving vehicle 100b may recognize an environment and objects for areas that are hidden from view or over a certain distance by receiving sensor information from external devices, or by receiving information directly recognized from the external devices.

The self-driving vehicle 100b may perform the above operations by using a learning model configured with at least one artificial neural network. For example, the self-driving vehicle 100b may recognize a surrounding environment and objects by using a learning model, and determine a driving path by using the recognized surrounding environment information or object information. Herein, the learning model may be obtained by directly performing learning by the self-driving vehicle 100b, or by performing learning by the external device such as an AI server 200, etc.

Herein, the self-driving vehicle 100b may generate a result by directly using the learning model so as to perform operations. However, the self-driving vehicle 100b may transmit the sensor information to the external device such as an AI server 200, and receive a result generated according thereto so as to perform operations.

The self-driving vehicle 100b may determine a moving path and a driving plan by using at least one among map data, object information detected from the sensor information, and object information obtained from the external device, and drive according to the determined moving path and the driving plan by controlling a driving part.

Map data may include object identification information on various objects (for example, roads) arranged in a space where the self-driving vehicle 100b drives. For example, the map data may include object identification information on fixed objects such as street lamps, rocks, buildings, etc. and movable objects such as vehicles, pedestrians, etc. In addition, the object identification information may include a name, a type, a distance, a position, etc.

In addition, the self-driving vehicle 100b may perform operations or drive by controlling the driving part on the basis of the user's control/interaction. Herein, the self-driving vehicle 100b may obtain intention information on interaction according to a user's behavior or voice input, and determine a response on the basis of the obtained intention information so as to perform operations.

The XR device 100c may be employed by using a HMD, a HUD provided in a vehicle, a TV, a mobile phone, a smart phone, a PC, a wearable device, a home appliance, a digital signage, a vehicle, or a fixed type robot or movable type robot. The XR device 100c analyze 3D point cloud data or image data which is obtained through various sensors or external devices, generate position data and feature data on 3D points, and obtain information on a surrounding space and real objects and output XR objects to be rendered. For example, the XR device 100c may output XR objects including additional information on the recognized objects by reflecting the same in the corresponding recognized objects.

The XR device 100c may perform the above operations by using a learning model configured with at least one artificial neural network. For example, the XR device 100c may recognize real objects from 3D point cloud data or image data by using a learning model, and provide information in association with the recognized real objects. Herein, the learning model may be obtained by directly performing learning by the XR device 100c, or by performing learning by the external device such as an AI server 200, etc.

Herein, the XR device 100c may generate a result by directly using the learning model so as to perform operations. However, the XR device 100c may transmit the sensor information to the external device such as an AI server 200, and receive a result generated according thereto so as to perform operations.

The robot 100a may be employed in a guide robot, a transport robot, a cleaning robot, a wearable robot, an entertainment robot, a pet robot, an unmanned flying robot, etc. by applying the AI technique and the self-driving technique thereto. The robot 100a to which the AI technique and the self-driving technique are applied may mean a robot itself with a self-driving function, or the robot 100a operating in conjunction with the self-driving vehicle 100b.

The robot 100a with the self-driving function may refer to all devices moving by itself according to a given movement, or by determining a moving path by itself without a user control. The robot 100a and the self-driving vehicle 100b which respectively have self-driving functions may use a common sensing method for determining at least one among a moving path and a driving plan. For example, the robot 100a and the self-driving vehicle 100b which respectively have self-driving functions may determine a moving path or driving plan by using information sensed through a lidar, a radar, a camera, etc.

The robot 100a operating in conjunction with the self-driving vehicle 100b may be present separate from the self-driving vehicle 100b, while the robot 100a is internally or externally connected to the self-driving function of the self-driving vehicle 100b, or may perform operations in association with the driver of the self-driving vehicle 100b.

Herein, the robot 100a operating in conjunction with the self-driving vehicle 100b may obtain sensor information in place of the self-driving vehicle 100b so as to provide the information to the self-driving vehicle 100b, or obtain sensor information and generate surrounding environment information or object information so as to provide the information to the self-driving vehicle 100b, and thus control or supplement the self-driving function of the self-driving vehicle 100b.

Alternatively, the robot 100a operating in conjunction with the self-driving vehicle 100b may monitor a driver of the self-driving vehicle 100b, or control functions of the self-driving vehicle 100b by operating in conjunction with the driver. For example, when it is determined that the driver is drowsy, the robot 100a may activate the self-driving function of the self-driving vehicle 100b or control the driving part of the self-driving vehicle 100b. Herein, functions of the self-driving vehicle 100b which are controlled by the robot 100a include, in addition to the self-driving function, functions provided from a navigation system or audio system provided in the self-driving vehicle 100b.

Alternatively, the robot 100a operating in conjunction with the self-driving vehicle 100b may provide information or supplement functions of the self-driving vehicle 100b from the outside of the self-driving vehicle 100b. For example, the robot 100a may provide traffic information including signal information such as smart signals to the self-driving vehicle 100b, or may automatically connect to an electrical charging device such as an automatic electric charger of an electric vehicle by operating in conjunction with the self-driving vehicle 100b.

The robot 100a may be employed in a guide robot, a transport robot, a cleaning robot, a wearable robot, an entertainment robot, a pet robot, an unmanned flying robot, a drone, etc. by applying the AI technique and the XR technique thereto.

The robot 100a to which the XR technique is applied may mean a robot that becomes a target controlled/operated within an XR image. Herein, the robot 100a may be distinguished from the XR device 100c and operate in conjunction with the same.

For the robot 100a that becomes a target controlled/operated within an XR image, when sensor information is obtained from sensors including a camera, the robot 100a or the XR device 100c may generate an XR image on the basis of the sensor information, and the XR device 100c may output the generated XR image. In addition, the above robot 100a may operate on the basis of a control signal input through the XR device 100c, or in conjunction with the user. For example, the user may check an XR image in association with a view of the robot 100a that is in conjunction with the external device such as XR device 100c in a remote manner, adjust a self-driving path of the robot 100a through in conjunction with the robot 100a, control operations or driving, or check information on surrounding objects.

The self-driving vehicle 100b may be employed in a movable robot, a vehicle, an unmanned flying robot, etc. by applying the AI technique and the XR technique thereto. The self-driving vehicle 100b to which the XR technique is applied may mean self-driving vehicle provided with a device providing an XR image, and self-driving vehicle that becomes a target controlled/operated within an XR image, etc. Particularly, the self-driving vehicle 100b that becomes a target controlled/operated within an XR image may be distinguished from the XR device 100c, and operate in conjunction with the same.

The self-driving vehicle 100b provided with a device providing an XR image may obtain sensor information from sensors including a camera, and output an XR image generated on the basis of the obtained sensor information. For example, the self-driving vehicle 100b outputs an XR image by using a HUD, and thus provides to a passenger a real object or XR object in association with objects within a screen.

Herein, when the XR object is displayed on the HUD, at least a part of the XR object may be displayed to overlap the real object to which the passenger's eyes are directed. On the other hands, when the XR object displayed on a display included in the self-driving vehicle 100b, at least a part of the XR object may be displayed to overlap an object within the screen. For example, the self-driving vehicle 100b may output XR objects in association with carriageways, other vehicles, signals, traffic signs, motorcycles, pedestrians, buildings, etc.

For the self-driving vehicle 100b that becomes a target controlled/operated within an XR image, when sensor information is obtained from sensors including a camera, the self-driving vehicle 100b or XR device 100c may generate an XR image on the basis of the sensor information, and the XR device 100c may output the generated XR image. In addition, the above self-driving vehicle 100b may operate on the basis of a control signal input through the external device such as XR device 100c, etc. or in conjunction with the user.

Figure 4:
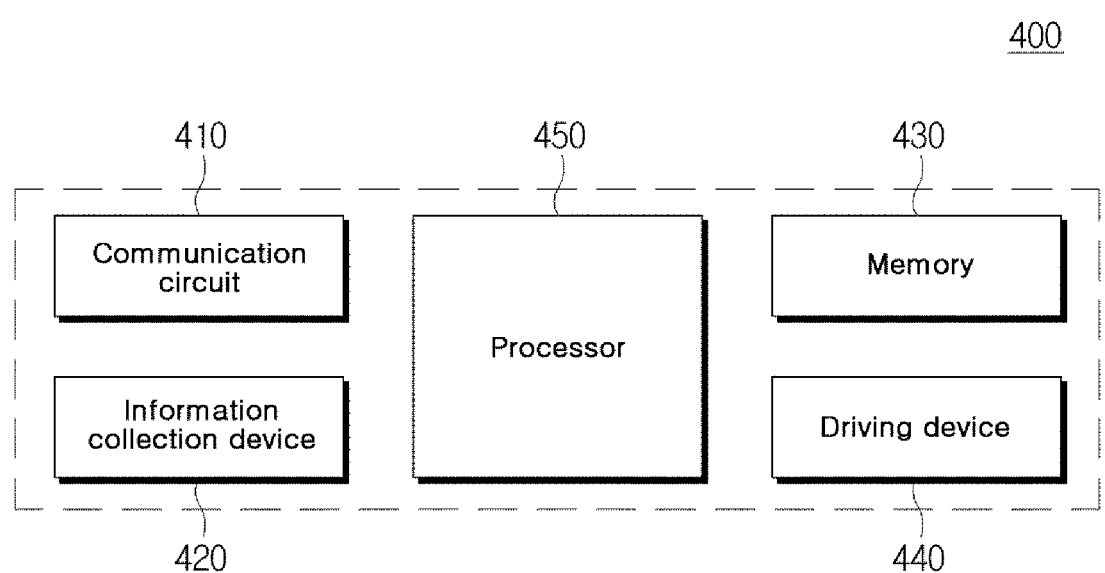
FIG. 4 is a view conceptually showing a self-driving robot according to embodiments of the present disclosure.
Figure 5:
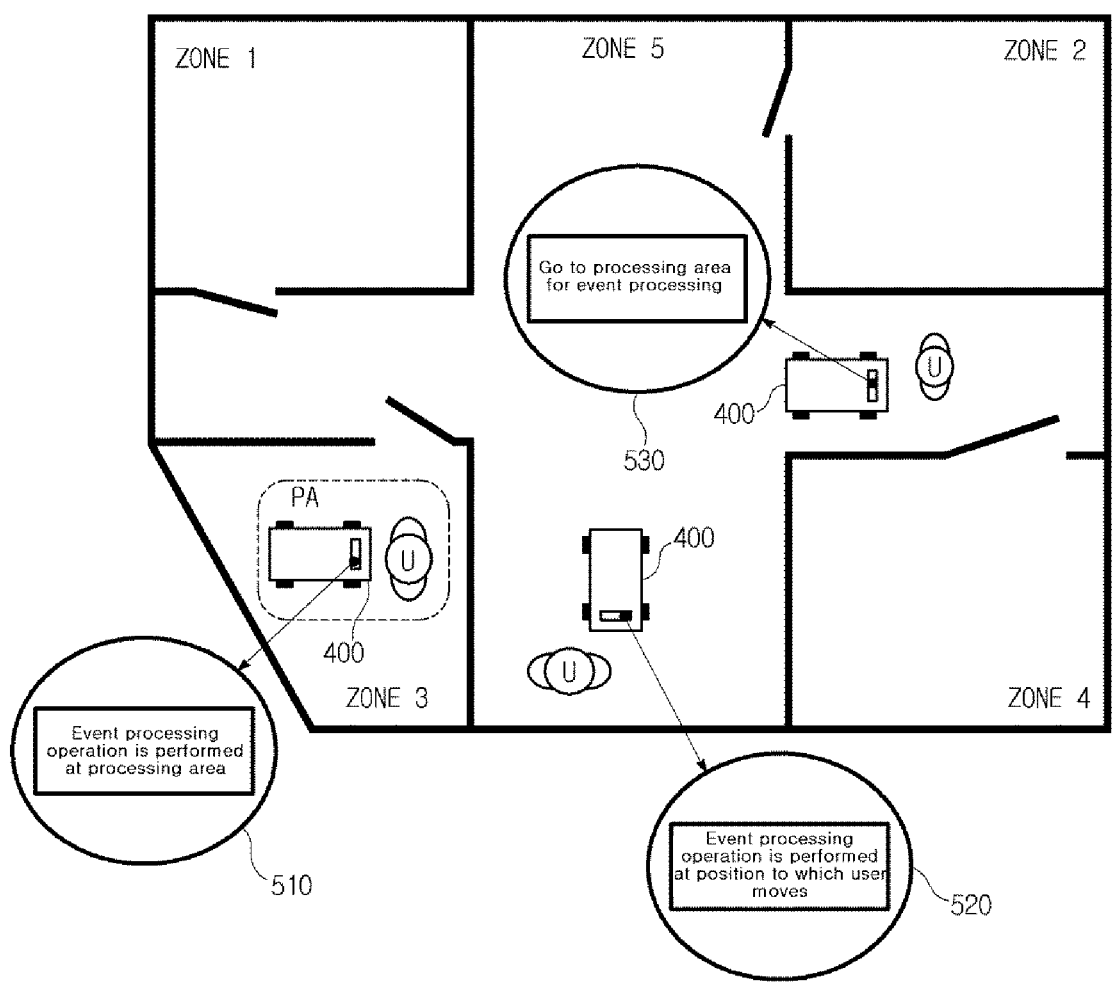
FIG. 5 is a view showing a delivery event processing operation of a self-driving robot according to various embodiments of the present disclosure.

FIG. 4 is a view conceptually showing a self-driving robot 400 according to embodiments of the present disclosure. FIG. 5 is a view 500 showing a delivery event processing operation of the self-driving robot 400 according to various embodiments of the present disclosure. The self-driving robot 400 shown in FIG. 4 may have a configuration similar to or the same as that of the AI apparatus 100 described above with reference to FIG. 1. For example, referring to FIG. 4, the self-driving robot 400 may include a communication circuit 410, an information collection device 420, a memory 430, a driving device 440, and a processor 450. However, this is merely exemplary, and the embodiment of the present disclosure is not limited thereto. For example, at least one of the elements of the self-driving robot 400 described above may be omitted, or one or more other elements (for example, a microphone, a speaker, a display, a robotic arm, a package-loading box, and the like) may be added.

The self-driving robot 400 according to various embodiments of the present disclosure may process a delivery event while moving inside (or outside) a building (for example, zone 1 to zone 5) as shown in FIG. 5. A delivery event may include: a package take-over event in which a delivery package is received from a sender and is loaded in a loading box of the self-driving robot 400; and a package hand-over event in which the loaded delivery package is handed over to a recipient. For example, the self-driving robot 400 may process 510 a delivery event through an interaction with a user U, at a pre-designated event processing area PA, for example, a loading area and a hand-over area. As another example, in addition to the event processing area PA, the self-driving robot 400 may process 520 the delivery event through an interaction with the user U at an authorized area in which an event processing (for example, hand-over of a package and take-over of a package) authority of the user is given. As still another example, the self-driving robot 400 may induce 530 the delivery event processing at the event processing area PA or the authorized area, when the interaction with the user occurs at an area in which an event processing authority of the user is not given, the area being outside the event processing area PA.

The communication circuit 410 may be configured to transmit and receive data from another robot or an external device (for example, a server). According to various embodiments, the communication circuit 410 may be a transceiver configured to transmit and receive wireless signals, and the communication circuit 410 may perform the function of the communication circuit 110 shown in FIG. 1. According to an embodiment, at least a part of data received from another robot or an external device may contain delivery authority information including: information on the processing authority (for example, a package hand-over authority and a package take-over authority) for the delivery event with respect to the user who performs the interaction with the self-driving robot 400; and information on the authorized area in which the processing authority is given. For example, the communication circuit 410 may include a cellular communication circuit, a short-range wireless communication circuit, a global navigation satellite system (GNSS) communication circuit, or the like, but it is not limited thereto.

The information collection device 420 may detect the surrounding environment of the self-driving robot 400 and may generate information on the detected surrounding environment. According to various embodiments, the information collection device 420 may detect a user U and generate information (for example, image data) for identifying the user according to a result of detection. According to embodiments, the information collection device 420 may include at least one sensor, such as a camera, a lidar, a radar, an ultrasonic sensor, a proximity sensor, an optical sensor, or the like, but it is not limited thereto. According to another embodiment, the information collection device 420 may further include at least one biometric sensor (for example, a fingerprint recognition sensor, an iris recognition sensor, a face recognition sensor, or the like) for authenticating an event operator.

The memory 430 may store a variety of data used by at least one of the elements (for example, the communication circuit 410, the information collection device 420, the driving device 440, and the processor 450) of the self-driving robot 400. According to various embodiments, the memory 430 may include at least one among a non-volatile memory device and a volatile memory device.

The driving device 440 may generate driving force to move the self-driving robot 400. According to various embodiments, the driving device 440 may be a motor, an actuator, or a steering device, but it is not limited thereto. According to an embodiment, the driving device 440 may generate driving force for walking or driving of the self-driving robot 400. For example, the self-driving robot 400 may include a traveling device or a walking device, such as a wheel, a belt, a leg, or the like, and may move by transferring the driving force generated by the driving device 440 to the traveling device or the walking device.

The processor 450 may be configured to control the overall operations of the self-driving robot 400. According to an embodiment, the processor 450 may execute software (for example, a program) stored in the memory 430 to control at least one of the elements (for example, the communication circuit 410, the information collection device 420, the memory 430, and the driving device 440) of the self-driving robot 400 which are connected to the processor 450. For example, the processor 450 may include a processor having a calculation processing function. For example, the processor 450 may include a calculation processing device such as CPU (central processing unit), MCU (micro computer unit), GPU (graphics processing unit), etc., but it is not limited thereto.

According to various embodiments, the processor 450 may control the following delivery processing operation. The processor 450 may move inside or outside a building in order to process the delivery event. According to an embodiment, the processor 450 may determine a moving path (for example, a delivery path) to process the package take-over event or the package hand-over event, and may control the driving device 440 to move the self-driving robot 400 along the moving path. The moving path may be determined on the basis of information on delivery destinations of the packages loaded in the self-driving robot 400. For example, in the case of moving to multiple delivery destinations, the processor 450 may determine the optimum moving path for minimizing the time required for delivery, the distance, or the like. However, this is merely exemplary, and the embodiment of the present disclosure is not limited thereto. As another example, the processor 450 may determine a delivery sequence on the basis of weights of the loaded packages, and may determine the moving path according to the determined delivery sequence.

The processor 450 may move inside or outside a building and may then detect the delivery event. According to an embodiment, the delivery event may be detected by occurrence of the interaction between the self-driving robot 450 and the user. For example, the interaction may include a user's request to call the self-driving robot 400 on the move to fulfill a delivery duty.

The processor 450 may determine, in response to detecting the delivery event, whether to process the delivery event. According to an embodiment, the processor 450 may determine whether to process the delivery event, on the basis of the delivery authority information of the user and the position (for example, the current position of the self-driving robot 400) at which the delivery event is detected. The delivery authority information may include information on the processing authority (for example, the package hand-over authority and the package take-over authority) of the delivery event, and information on the authorized area in which the processing authority is given. For example, the processor 450 determines that the processor 450 is capable of processing the delivery event, when the position at which the delivery event is detected corresponds to the authorized area acquired from the delivery authority information. The processor 450 determines that the processor 450 is incapable of processing the delivery event, when the position at which the delivery event is detected does not correspond to the authorized area.

The processor 450 processes the delivery event, when the processor 450 determines that the processor 450 is capable of processing the delivery event. According to an embodiment, the processor 450 may process the package hand-over event and/or the package take-over event, at the position where the delivery event is detected. For example, the processor 450 may open the loading box provided in the self-driving robot 400, in order to hand over the loaded package or to load the delivery package.

When the processor 450 determines that the processor 450 is incapable of processing the delivery event, the processor 450 induces the delivery event processing at a position where the processor 450 is capable of processing the delivery event. According to an embodiment, examples of the position where the processor 450 is capable of processing the delivery event may include the pre-designated event processing area, the authorized area, which is defined as an area in which the package hand-over or take-over authority of the user is given, and the like. For example, the processor 450 may provide guide information so that the user moves to the position at which the processor 450 is capable of processing the delivery event. For example, the guide information may be provided through at least one among a display, and a speaker.

Figure 6:
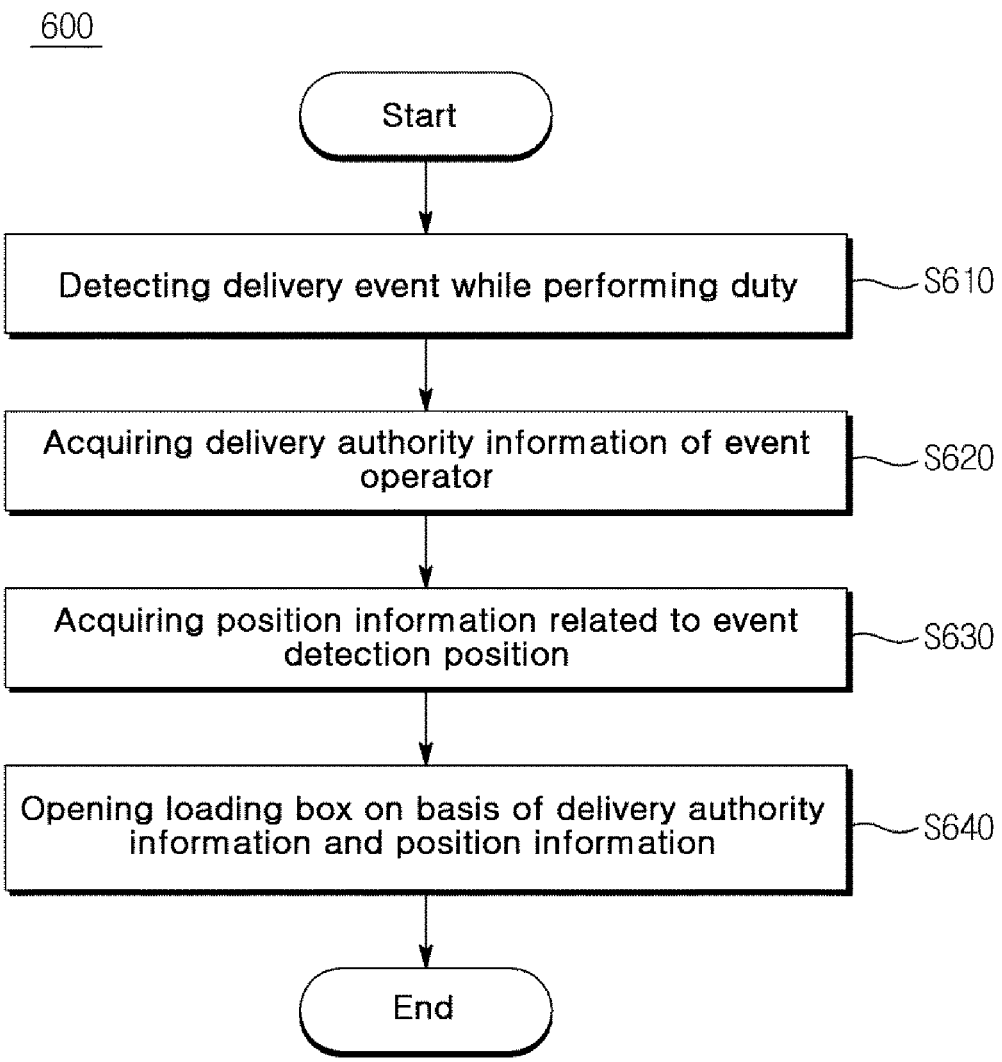
FIG. 6 is a flowchart showing a delivery event processing method of a self-driving robot according to embodiments of the present disclosure.

FIG. 6 is a flowchart 600 showing a delivery event processing method of the self-driving robot 400 according to embodiments of the present disclosure. In the following embodiment, the steps may be performed sequentially, but are not necessarily performed sequentially. In addition, the following steps may be performed by the processor 450 of the self-driving robot 400 or may be implemented by instructions executable by the processor 450.

Referring to FIGS. 4 and 6, according to various embodiments, the self-driving robot 400 may detect the delivery event while performing a duty, at step S610. The delivery event may include the package take-over event and the package hand-over event, as described above. For example, the self-driving robot 400 may detect the delivery event, on the basis of the interaction (for example, a request to call the self-driving robot, from the user) with the user which occurs while moving.

According to various embodiments, the self-driving robot 400 may acquire the delivery authority information of the event operator, at step S620. The event operator may be the person who generates the interaction to process the package take-over event and/or the package hand-over event. The delivery authority information may include user identification information, the processing authority, and the authorized area, as shown in Table 1 below. In addition, the user identification information may further include authentication information for user authentication.

TABLE 1

| User identification information | Processing authority | | Authorized area |
|---|---|---|---|
| USER 1 | Package take-over event | Y | ZONE 1 |
| | Package hand-over event | N | |

According to an embodiment, the self-driving robot 400 may identify the event operator who wants to process the delivery event, on the basis of the identification information. The self-driving robot 400 may determine, on the basis of the processing authority, whether the event operator has the authority to process the package take-over event, whether the event operator has the authority to process the package hand-over event, or whether the event operator has both the package hand-over authority and the package take-over authority. Further, the self-driving robot 400 may identify, on the basis of the authorized area, the area at which the self-driving robot 400 is capable of processing the delivery event for the identified user. For example, the authority information may be stored in an ID card of the user who wants to process the delivery event. The self-driving robot 400 may acquire the delivery authority information in response to tagging of the ID card. However, this is merely exemplary, and the embodiment of the present disclosure is not limited thereto. For example, the delivery authority information may be stored in at least one external device (for example, a mobile communication device, a wearable device, or the like) that the user owns. The self-driving robot 400 may establish communication with the at least one external device to acquire the delivery authority information.

According to various embodiments, the self-driving robot 400 may acquire position information related to a delivery event detection position (or an event occurrence position), at step S630. According to an embodiment, the event detection position may be the current position of the self-driving robot 400. For example, the self-driving robot 400 may acquire the position information by using various known methods, such as a position tracking (for example, indoor-position tracking and outdoor-position tracking) method, an image analysis method, and the like.

According to various embodiments, the self-driving robot 400 may open the loading box on the basis of the delivery authority information and the position information, at step S640. According to an embodiment, the self-driving robot 400 may include the loading box for storing the package. When the self-driving robot 400 determines that the self-driving robot 400 is capable of processing the delivery event, on the basis of the delivery authority information and the position information, the self-driving robot 400 opens the loading box as part of the package take-over event and the package hand-over event.

Figure 7:
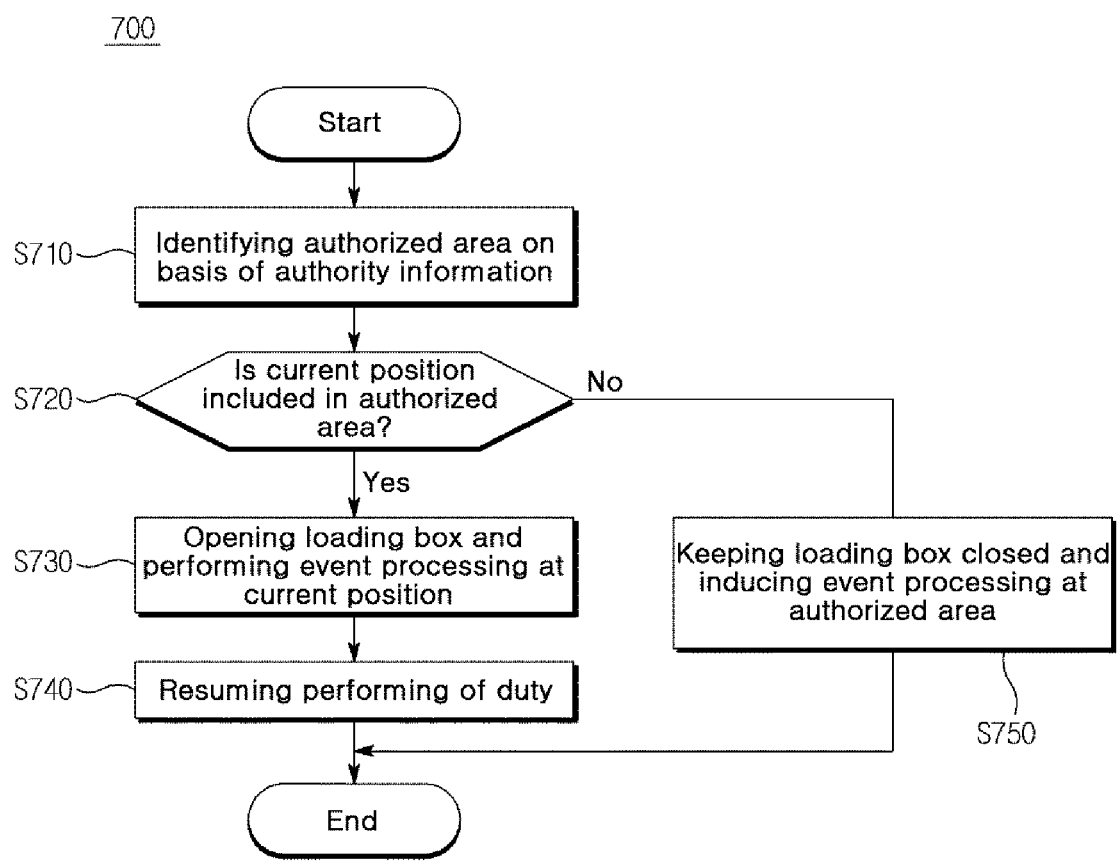
FIG. 7 is a flowchart showing a loading-box opening method of a self-driving robot according to various embodiments of the present disclosure.

FIG. 7 is a flowchart 700 showing a loading-box opening method of the self-driving robot 400 according to various embodiments of the present disclosure. The steps of FIG. 7 described below may represent various examples of step S640 of FIG. 6. Further, in the following embodiment, the steps are not necessarily performed sequentially. At least one of the disclosed steps may be omitted or another step may be added. In addition, the steps of FIG. 7 may be performed by the processor 450 of the self-driving robot 400 or may be implemented by instructions executable by the processor 450.

Referring to FIGS. 4 and 7, according to various embodiments, the self-driving robot 400 may identify the authorized area on the basis of the delivery authority information, at step S710. For example, the self-driving robot 400 may identify, on the basis of the authorized area, the area at which the identified user is capable of processing the delivery event. According to various embodiments, the self-driving robot 400 may determine whether the current position is included in the authorized area, at step S720.

According to various embodiments, when the current position is included in the authorized area, the self-driving robot 400 opens the loading box and performs an event processing operation at the current position at step S730. According to an embodiment, after the self-driving robot 400 opens the loading box, the self-driving robot 400 may perform at least one among a package hand-over operation and a package take-over operation, as described below with reference to FIGS. 8 and 10.

According to various embodiments, when the current position is not included in the authorized area, the self-driving robot 400 keeps the loading box closed and induces the event processing at the authorized area, at step S750. For example, as shown in the reference numeral 530 of FIG. 5, the self-driving robot 400 may output the guide information (for example, "go to the processing area for event processing") for inducing the event processing at the authorized area, by using the output device, such as a display, a speaker, or the like.

According to various embodiments, after the event processing operation (step S730) at the current position is performed or after the operation (step S750) of inducing the event processing at the authorized area is performed, the self-driving robot 400 resumes performing of the duty, at step S740. According to an embodiment, the self-driving robot 400 may process the delivery event, moving along the determined moving path.

Figure 8:
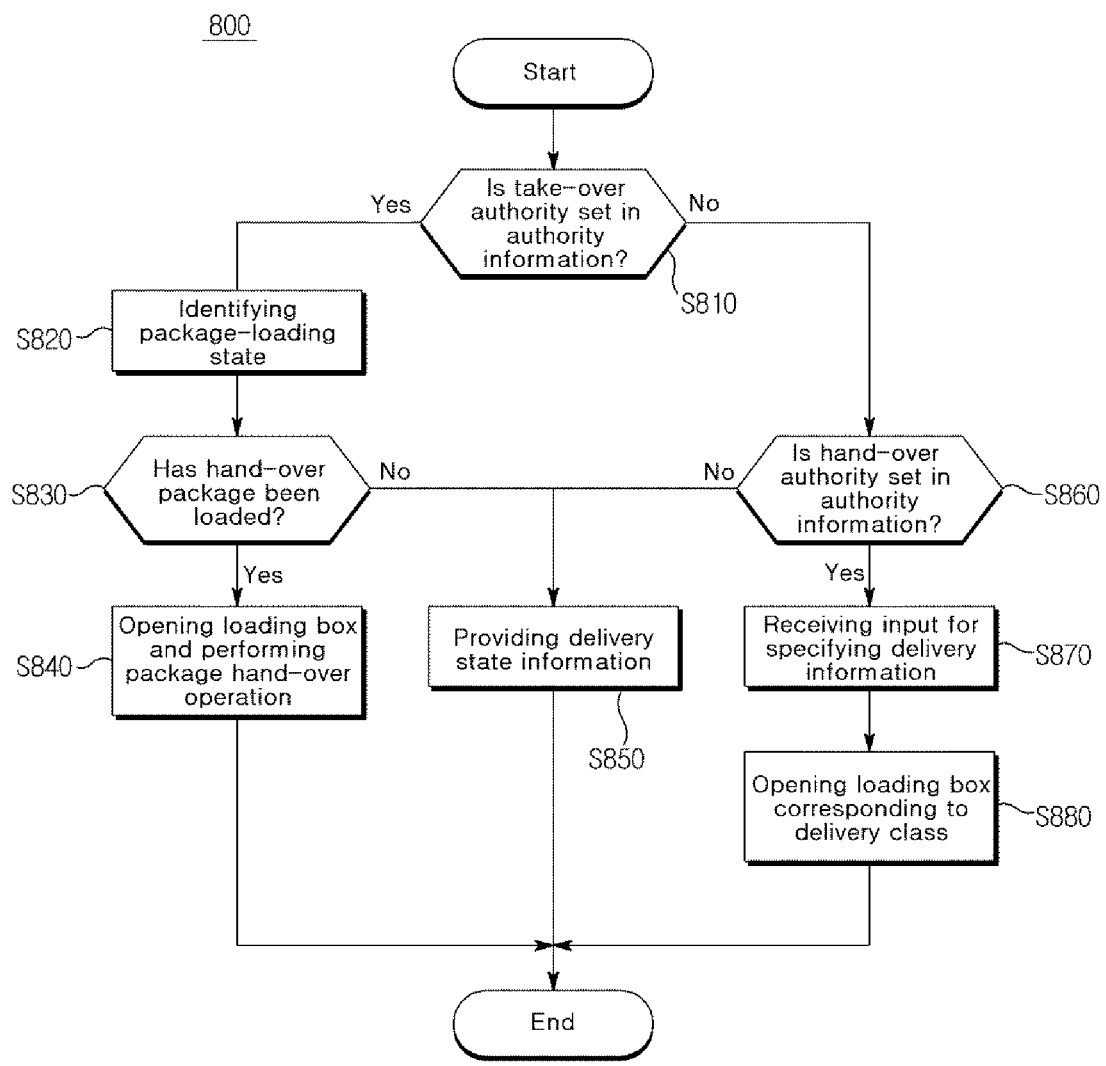
FIG. 8 is a flowchart showing an event processing method of a self-driving robot according to embodiments of the present disclosure.
Figure 9:
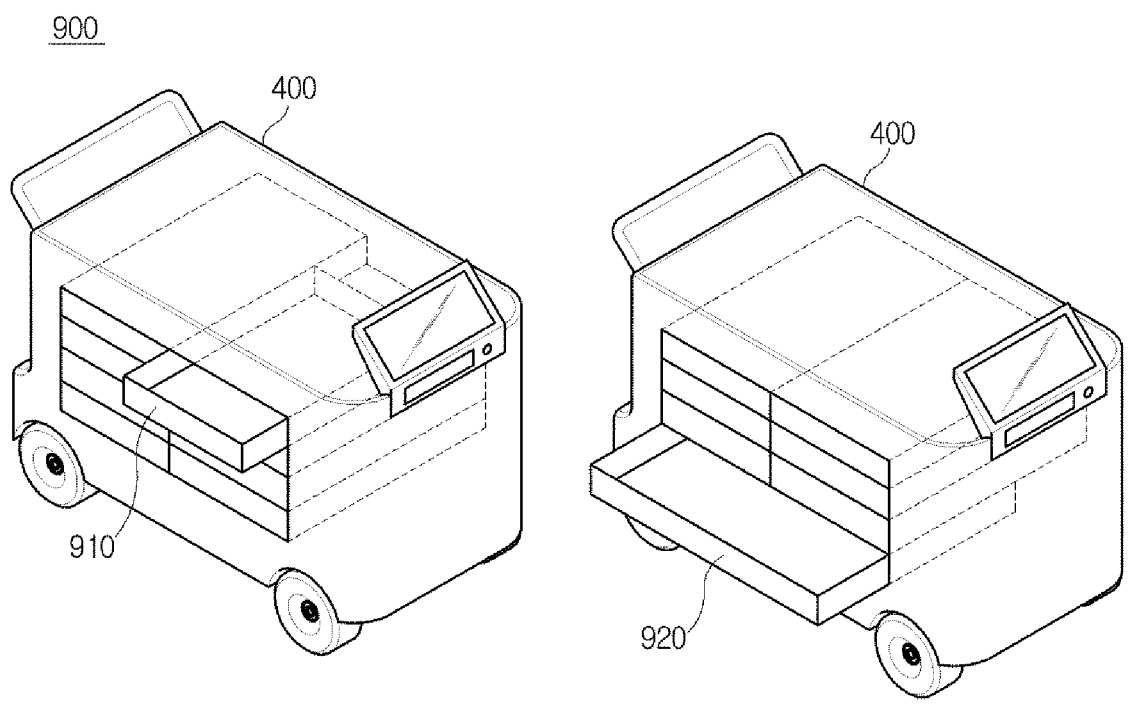
FIG. 9 is a view showing a loading-box opening operation of a self-driving robot according to various embodiments of the present disclosure.

FIG. 8 is a flowchart 800 showing an event processing method of the self-driving robot 400 according to embodiments of the present disclosure. FIG. 9 is a view 900 showing a loading box opening operation of the self-driving robot 400 according to various embodiments of the present disclosure. The steps of FIG. 8 described below may represent various examples of step S730 of FIG. 7. Further, in the following embodiment, the steps are not necessarily performed sequentially. At least one of the disclosed steps may be omitted or another step may be added. In addition, the steps of FIG. 8 may be performed by the processor 450 of the self-driving robot 400 or may be implemented by instructions executable by the processor 450.

Referring to FIGS. 4 and 8, according to various embodiments, the self-driving robot 400 may determine whether the take-over authority is set in the delivery authority information, at step S810. According to an embodiment, the self-driving robot 400 may determine, on the basis of the delivery authority information (for example, the processing authority), whether the identified user has the package take-over authority, whether the identified user has the package hand-over authority, whether the identified uses has both the package take-over authority and the package hand-over authority, or whether the identified user does not have the delivery event processing authority.

According to various embodiments, when the take-over authority is set for the event operator, the self-driving robot 400 performs the package hand-over operation through steps S820 to S840. According to an embodiment, the self-driving robot 400 may identify a package-loading state at step S820. The identifying of the package-loading state may include identifying the packages loaded in the self-driving robot 400 to be delivered to the recipient. For example, the self-driving robot 400 may scan invoice information (for example, barcode information) attached on the loaded delivery package so as to identify the package-loading state.

According to an embodiment, the self-driving robot 400 may determine, on the basis of the package-loading state, whether a hand-over package has been loaded, at step S830. For example, the self-driving robot 400 may identify, on the basis of the delivery authority information (for example, the user identification information), the event operator having the take-over authority, and may determine whether the delivery package of which the recipient is the identified event operator has been loaded in the loading box.

According to an embodiment, when it is determined that the package to be handed over to the event operator has been loaded, the self-driving robot 400 opens the loading box and performs the package hand-over operation at step S840. According to an embodiment, the self-driving robot 400 may include one or more loading boxes 910 and 920 as shown in FIG. 9, and each of the loading boxes may be opened or closed in a slidable manner. However, this is merely exemplary, and the embodiment of the present disclosure is not limited thereto. For example, the loading boxes included in the self-driving robot 400 may be implemented in various forms. For example, the self-driving robot 400 may open the loading space where the hand-over package is loaded so as to allow the event operator to take out his/her package. As another example, in the case where the self-driving robot 400 includes an arm to take out the delivery package, the self-driving robot 400 may directly take out the delivery package loaded in the opened loading space and may hand over the delivery package to the event operator.

According to an embodiment, when it is determined that the package to be handed over to the event operator has not been loaded, the self-driving robot 400 provides a delivery state information at step S850. According to an embodiment, the self-driving robot 400 may provide estimated-arrival information (for example, "a take-over package will arrive in five minutes with another robot") of the package to be delivered, as at least part of the delivery state information, by using the output device, such as a display, a speaker, or the like. According to various embodiments, when the take-over authority is not set for the event operator, the self-driving robot 400 determines whether the hand-over authority is set in the delivery authority information, at step S860.

According to various embodiments, when the hand-over authority is not set for the event operator, the self-driving robot 400 provides the delivery state information at step S850. According to an embodiment, the self-driving robot 400 may provide reservation guide information (for example, "when making a delivery event reservation, please complete authority setting before the next robot arrives"), as at least part of the delivery state information, by using the output device, such as a display, a speaker, or the like.

According to various embodiments, when the hand-over authority is set for the event operator, the self-driving robot 400 performs the package take-over operation through steps S870 to S880. According to an embodiment, the self-driving robot 400 may receive an input for specifying delivery information, at step S870. The delivery information may include at least one among delivery destination information, recipient information (for example, the name, the phone number, or the like), a delivery request time, a type of delivery package, a delivery class, and handling precautions in delivery. For example, the self-driving robot 400 may identify the delivery information, on the basis of the input through an input device, such as a microphone, a camera, a touch sensor, or the like.

According to an embodiment, the self-driving robot 400 may open the loading box corresponding to the delivery class at step S880. The delivery class may include: a first class that requires authentication of the recipient when the package is handed over, or requires caution in delivery; and a second class that does not. For example, the self-driving robot 400 may determine the delivery class on the basis of the delivery information, and may open the loading box corresponding to the determined delivery class. For example, as shown in FIG. 9, when the delivery package corresponding to the first class is loaded, the self-driving robot 400 opens a loading box 910 corresponding to the first class, among loading boxes in which a package is not loaded. In addition, as shown in FIG. 9, when the delivery package corresponding to the second class is loaded, the self-driving robot 400 opens a loading box 920 corresponding to the second class, among loading boxes in which a package is not loaded. Herein, as described in the package hand-over operation, the delivery package may be loaded in the loading box directly by the user or by the arm of the self-driving robot 400.

Figure 10:
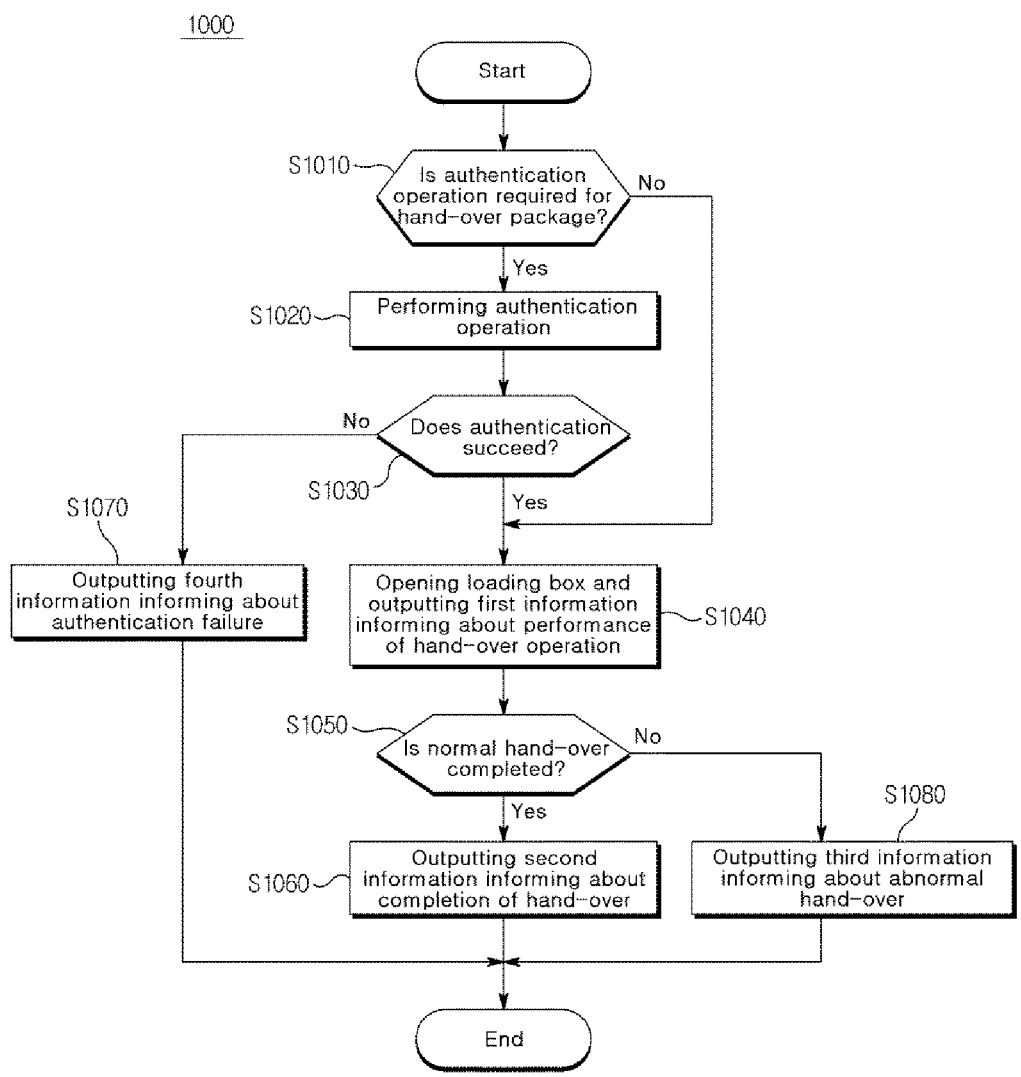
FIG. 10 is a flowchart showing a package hand-over method of a self-driving robot according to embodiments of the present disclosure.
Figure 11:
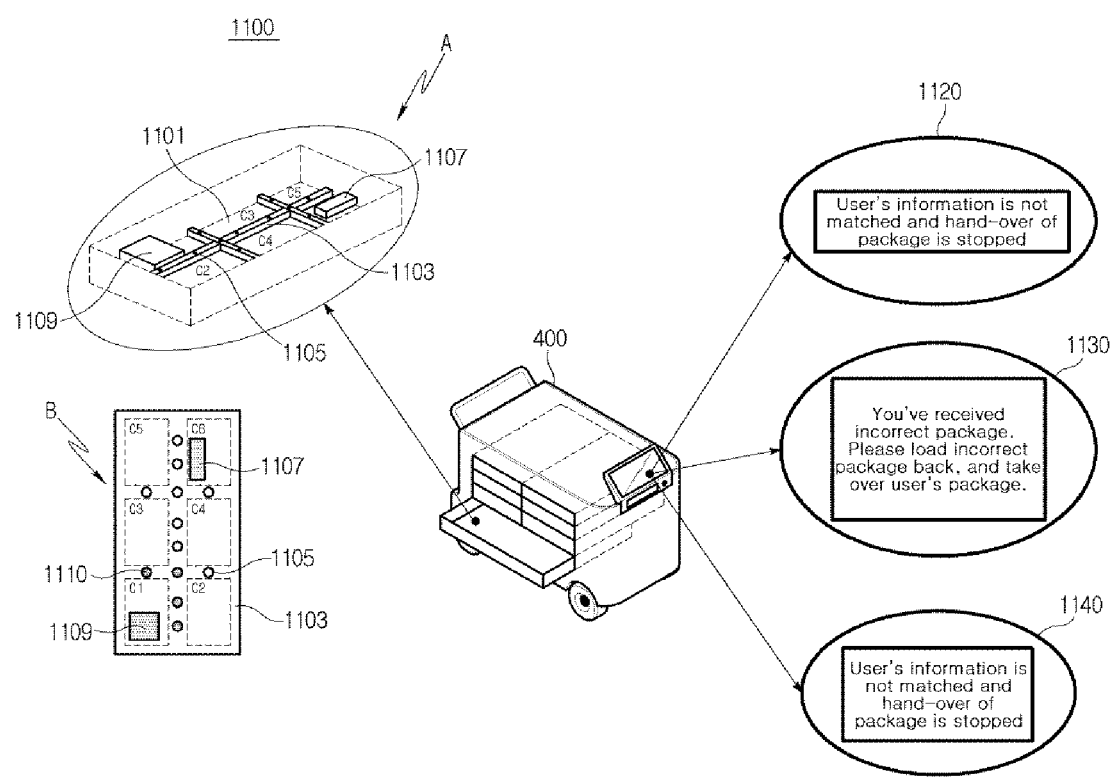
FIG. 11 is a view showing information informing about a hand-over operation state of a self-driving robot according to various embodiments of the present disclosure.

FIG. 10 is a flowchart 100 showing a package hand-over method of the self-driving robot 400 according to embodiments of the present disclosure. FIG. 11 is a view 1100 showing information informing about a hand-over operation state of the self-driving robot 400 according to various embodiments of the present disclosure. The steps of FIG. 10 described below may represent various examples of step S840 of FIG. 8. Further, in the following embodiment, the steps are not necessarily performed sequentially. At least one of the disclosed steps may be omitted or another step may be added. In addition, the steps of FIG. 10 may be performed by the processor 450 of the self-driving robot 400 or may be implemented by instructions executable by the processor 450.

Referring to FIGS. 4 and 10, according to various embodiments, the self-driving robot 400 may determine whether the authentication operation is required for the hand-over package, at step S1010. According to an embodiment, the self-driving robot 400 may determine whether the authentication operation is required, on the basis of the delivery information (for example, the delivery class) that is input when the hand-over package is loaded. For example, when the hand-over package has the delivery class of the first class, the self-driving robot 400 determines that an additional authentication operation for authenticating the recipient is required. In addition, when the hand-over package has the delivery class of the second class, the self-driving robot 400 determines that the additional authentication operation for authenticating the recipient is not required.

According to various embodiments, when the authentication operation is required for the hand-over package, the self-driving robot 400 performs the authentication operation of the recipient, at step S1020. According to an embodiment, the self-driving robot 400 may acquire the authentication information from the recipient and may compare the same with pre-stored information, thereby performing the authentication operation. For example, the self-driving robot 400 may perform a biometric authentication operation, such as fingerprint recognition, iris recognition, facial recognition, or the like. However, this is merely exemplary, and the embodiment of the present disclosure is not limited thereto. For example, the authentication operation may be performed by various known authentication methods, such as password authentication, or the like.

According to various embodiments, the self-driving robot 400 may identify a result of authentication, at step S1030. According to an embodiment, the self-driving robot 400 may determine whether authentication of the recipient succeeds or fails, on the basis of a result of comparison between the authentication information acquired from the recipient and the pre-stored information.

According to various embodiments, when authentication of the recipient succeeds, the self-driving robot 400 opens the loading box and outputs first information informing about performance of the hand-over operation, at step S1040. According to an embodiment, the first information may be information indicating a position in which the delivery package is loaded. The at least one loading box provided in the self-driving robot 400 may include multiple loading spaces (for example, C1 to C6) in which delivery packages 1107 and 1109 are loaded, as shown in the reference letters A and B of FIG. 11. The loading spaces may be defined by a protruding member (for example, a partition) 1103 that protrudes upward by a predetermined height from a lower part 1101 of the loading box. The protruding member 1103 may include light-emitting members 1105 arranged at regular intervals. For example, the self-driving robot 400 may output the first information by emitting 1110 the one or more light-emitting members that surround the loading space C1 in which the hand-over package 1109 is loaded. Accordingly, the recipient may recognize which package to take over, among the multiple packages loaded in the loading box.

According to various embodiments, the self-driving robot 400 may determine whether the hand-over package is handed over to the recipient normally, at step S1050. The at least one loading box provided in the self-driving robot 400 may include at least one sensor, which is not shown in the drawings. The at least one sensor is a sensor detecting the loading weight of the loading space, and the sensor may be provided at a bottom portion of the loading space. According to an embodiment, the self-driving robot 400 may monitor the loading weight of the loading space. The self-driving robot 400 may determine that a normal hand-over operation is completed, when a change occurs in the weight of the loading space in which the hand-over package is loaded. In addition, the self-driving robot 400 may determine that an abnormal hand-over operation is completed, when a change occurs in the weight of another loading space which is not the loading space in which the hand-over package is loaded.

According to various embodiments, in the case of determining the normal hand-over operation, the self-driving robot 400 may output second information informing about completion of hand-over of the package, at step S1060. According to an embodiment, as shown in FIG. 11, the self-driving robot 400 may output 1120 the second information (for example, "the package has been handed over normally") by using the output device, such as a display, a speaker, or the like, thereby notifying the recipient that hand-over of the package is completed.

According to various embodiments, in the case of determining the abnormal hand-over operation, the self-driving robot 400 may output third information informing about the abnormal hand-over of the package, at step S1080. According to an embodiment, as shown in FIG. 11, the self-driving robot 400 may output 1130 the third information (for example, "an abnormal package has been received") by using the output device, such as a display, a speaker, or the like, thereby inducing the normal hand-over of the package to the recipient.

According to various embodiments, when it is determined that authentication is not required, at step S1010, the self-driving robot 400 omits the authentication operation of the recipient and performs the package hand-over operation. According to an embodiment, the self-driving robot 400 may perform the operation of step S1040 without performing the operations of steps S1020 and S1030.

According to various embodiments, when it is determined that authentication of the recipient fails, at step S1030, the self-driving robot 400 outputs fourth information informing about authentication failure, at step S1070. According to an embodiment, as shown in FIG. 11, the self-driving robot 400 may output 1140 the fourth information (for example, "due to authentication failure, hand-over of the package is available in the authorized area") by using the output device, such as a display, a speaker, or the like, thereby notifying the recipient that hand-over of the package is impossible.

Figure 12:
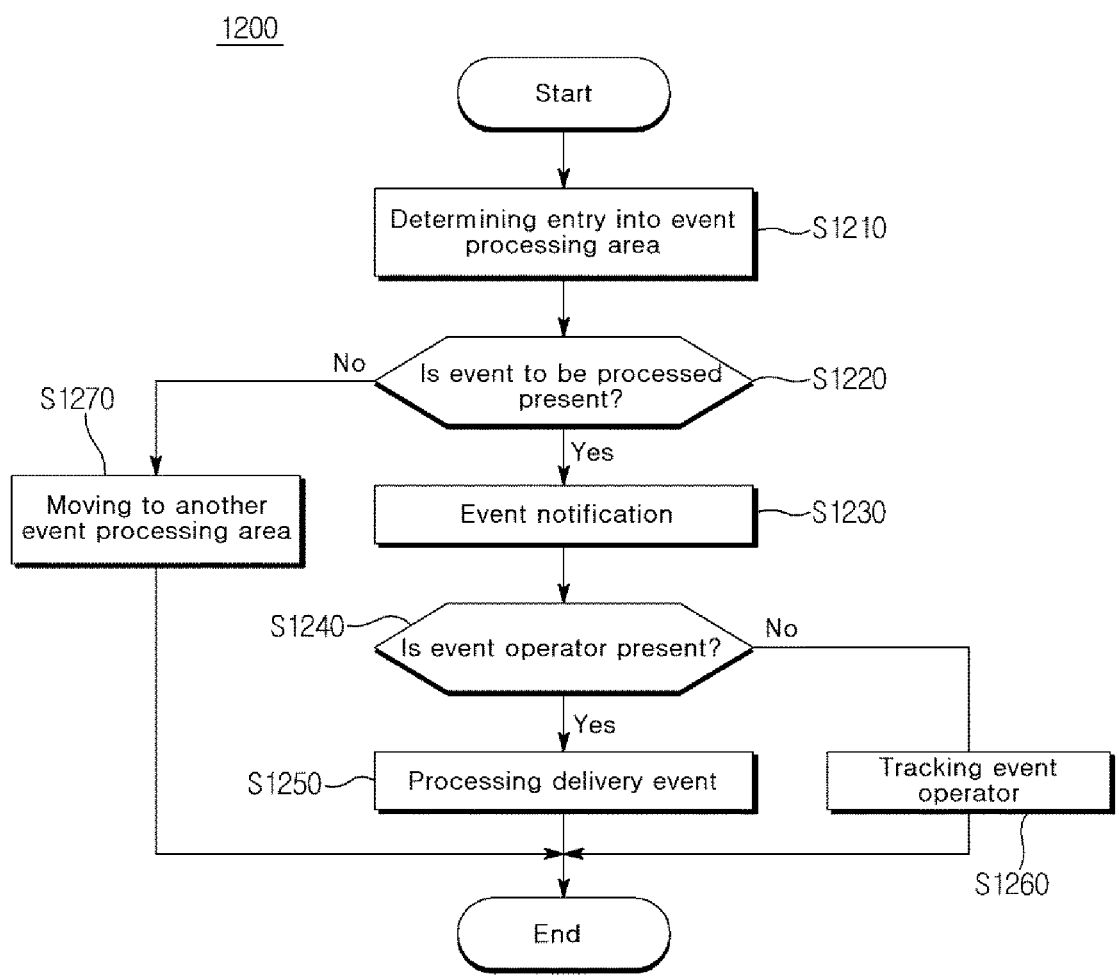
FIG. 12 is a flowchart showing a duty resumption method of a self-driving robot according to embodiments of the present disclosure.

FIG. 12 is a flowchart 1200 showing a duty resumption method of the self-driving robot 400 according to embodiments of the present disclosure. The steps of FIG. 12 described below may represent various examples of step S740 of FIG. 7. Further, in the following embodiment, the steps are not necessarily performed sequentially. At least one of the disclosed steps may be omitted or another step may be added. In addition, the steps of FIG. 12 may be performed by the processor 450 of the self-driving robot 400 or may be implemented by instructions executable by the processor 450.

Referring to FIGS. 4 and 12, according to various embodiments, the self-driving robot 400 may determine entry into the event processing area, at step S1210. As described above, the event processing area may include the pre-designated loading area and hand-over area. According to an embodiment, the self-driving robot 400 may determine the entry into the event processing area, identifying a moving position of the self-driving robot 400 by using various methods, such as a position tracking method, an image analysis method, and the like.

According to various embodiments, the self-driving robot 400 may determine whether an event to be processed is present in the event processing area, at step S1220. According to an embodiment, the self-driving robot 400 may manage event processing information defining an event to be processed for each event processing area. The event processing information may include: a list of package take-over events to be processed in the corresponding event processing area; and a list of package hand-over events for transferring the delivery package to the corresponding event processing area which is set as a delivery destination. For example, the self-driving robot 400 may identify the event processing information and may determine whether there is an event to be processed in the entered event processing area.

According to various embodiments, when determining whether the event to be processed is present, the self-driving robot 400 outputs event notification, at step S1230. The event notification may include a call for the event operator (for example, the recipient or the user who has reserved loading of a package). According to an embodiment, the self-driving robot 400 may output information (for example, "user 1's package has arrived" or "delivery of the user 1's package will be processed") for inducing event processing, by using the output device, such as a display, a speaker, or the like.

According to various embodiments, the self-driving robot 400 may determine whether the event operator is present, at step S1240. According to an embodiment, the self-driving robot 400 may determine whether the recipient who will process the package take-over event or the user who has reserved loading of the package is present in the event processing area, or whether the recipient or the user has left the event processing area. For example, the self-driving robot 400 may perform the operation of step S1240, on the basis of whether a specified signal is received from the event operator for a specified time after the event notification.

According to various embodiments, when the presence of the event operator is identified, the self-driving robot 400 may process the delivery event with the event operator, at step S1250. According to an embodiment, the self-driving robot 400 may perform the package hand-over operation in a manner that is the same as or similar to the operation at step S840 of FIG. 8. In addition, the self-driving robot 400 may perform the package take-over operation in a manner that is the same as or similar to the operations at steps S870 and S880 of FIG. 8.

According to various embodiments, when the presence of the event operator is not identified, the self-driving robot 400 performs an operation of tracking the event operator at step S1260. According to an embodiment, the self-driving robot 400 may request a processing proxy, who will perform event processing instead, to perform event processing or may move to an area where the event operator is positioned, as will be described later with reference to FIG. 13.

According to various embodiments, when it is determined that the event to be processed is not present, at step S1220, the self-driving robot 400 moves to another event processing area at step S1270. According to an embodiment, the self-driving robot 400 may process the delivery event, moving along the moving path.

Figure 13:
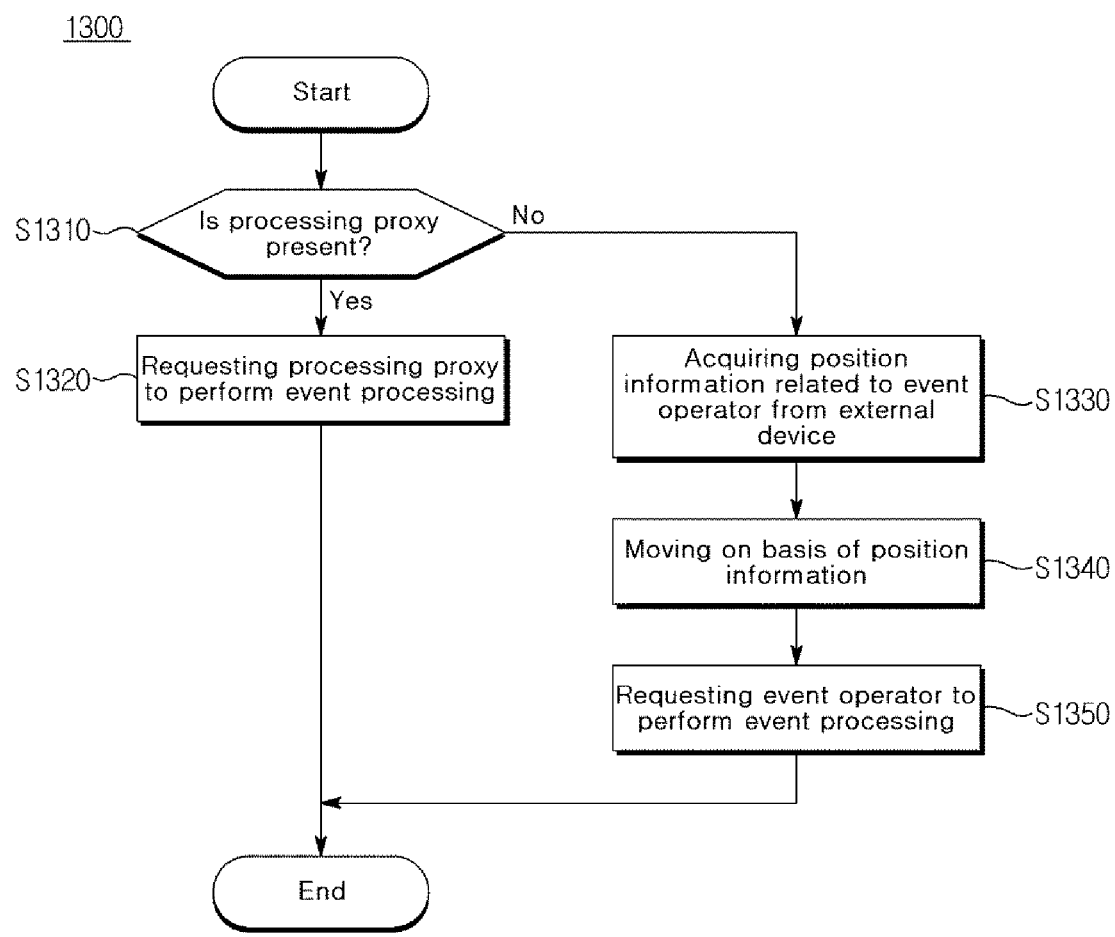
FIG. 13 is a flowchart showing an event operator tracking method of a self-driving robot according to embodiments of the present disclosure.

FIG. 13 is a flowchart 1300 showing an event operator tracking method of the self-driving robot 400 according to embodiments of the present disclosure. The steps of FIG. 13 described below may represent various examples of step S1260 of FIG. 12. Further, in the following embodiment, the steps are not necessarily performed sequentially. At least one of the disclosed steps may be omitted or another step may be added. In addition, the steps of FIG. 13 may be performed by the processor 450 of the self-driving robot 400 or may be implemented by instructions executable by the processor 450.

Referring to FIGS. 4 and 13, according to various embodiments, the self-driving robot 400 may determine whether the processing proxy is present, at step S1310. According to an embodiment, the processing proxy may be the person who processes the event in the absence of the event operator. For example, information on the processing proxy may be additionally included in the delivery authority information, as shown in Table 2 below. As another example, the self-driving robot 400 may establish communication with the event operator who is absent, to acquire the information on the processing proxy. As still another example, the self-driving robot 400 may specify at least one of nearby people, as the processing proxy. Herein, the self-driving robot 400 may determine the processing proxy on the basis of the class of the event. For example, with respect to the event having a class equal to or higher than a predetermined level, the self-driving robot 400 may determine, as the processing proxy, the person who has a relationship of a predetermined level with the event operator, among nearby people.

TABLE 2

| User identification information | Processing authority | Authorized area | Processing proxy |
|---|---|---|---|
| USER 1 | Package take-over event Y | ZONE 1 | USER 2 |
| | Package hand-over event N | | |

According to various embodiments, when the presence of the processing proxy is identified, the self-driving robot 400 requests the processing proxy to perform event processing, at step S1320. According to an embodiment, the self-driving robot 400 may request the processing proxy to perform the package hand-over operation or the package take-over operation.

According to various embodiments, when the presence of the processing proxy is not identified, the self-driving robot 400 may acquire position information related to the event operator from at least one external device, at step S1330. For example, the at least one external device may be at least one another robot (for example, another robot that acquires the delivery authority information of the event operator) performing a delivery duty around the self-driving robot 400. As another example, the at least one external device may be at least one electronic device that the event operator who is absent owns.

According to various embodiments, the self-driving robot 400 may move on the basis of the acquired position information, at step S1340. According to an embodiment, the self-driving robot 400 may move to the position of the event operator. For example, the self-driving robot 400 may move to the position of the event operator, performing the delivery event along the moving path. For example, when the self-driving robot 400 approaches the position of the event operator while performing the delivery event, the self-driving robot 400 temporarily stop the delivery event and then move to the position of the event operator. As another example, the self-driving robot 400 may move to the position of the event operator first, before performing the delivery event along the moving path.

According to various embodiments, the self-driving robot 400 may request the event operator to perform event processing, at step S1350. According to an embodiment, the self-driving robot 400 may request the event operator to perform the package hand-over operation or the package take-over operation at the position to which the self-driving robot 400 has moved.

According to various embodiments, when moving to the event operator is impossible, the self-driving robot 400 notifies the event operator that event processing is impossible. According to an embodiment, the self-driving robot 400 may provide upcoming visit information (for example, "it is possible to receive the package at the current position after 30 minutes") for the event processing area.

According to various embodiments of the present disclosure, a self-driving robot (for example, the self-driving robot 400) may include: a loading box including at least one loading space; a communication circuit (for example, the communication circuit 410) configured to transmit and receive a signal; an information collection device (for example, the information collection device 420) configured to detect a surrounding environment; a driving device (for example, the driving device 440) configured to implement movement of the self-driving robot; and a processor (for example, the processor 450) configured to control the loading box, the communication circuit, and the information collection device. According to an embodiment, the processor may perform control so that the self-driving robot identifies delivery authority information and position information of an event operator, in response to detecting a delivery event while moving along a moving path, and the self-driving robot determines whether to open the loading box, on the basis of the delivery authority information and the position information. For example, the delivery authority information may include information on the authorized area in which the event processing authority of the event operator is given.

According to various embodiments of the present disclosure, the delivery authority information may include an event processing authority of the event operator which is related to at least one among a package hand-over authority and a package take-over authority. The processor may perform control so that in response to determining opening of the loading box, the self-driving robot hands over a package loaded in the loading box or loads a take-over package in the loading box, on the basis of the event processing authority.

According to various embodiments of the present disclosure, the processor may perform control so that while handing over the package, the self-driving robot provides first information indicating a position of a hand-over package loaded in the loading box.

According to various embodiments of the present disclosure, the processor may perform control so that when a hand-over package related to the event operator is not loaded in the loading box, the self-driving robot provides the delivery information of the hand-over package.

According to various embodiments of the present disclosure, the loading box may include a sensor configured to detect a weight of the loaded package. The processor may perform control so that the self-driving robot monitors a weight inside the loading box and determines, on the basis of a result of the monitoring, whether a hand-over package loaded in the loading box is handed over normally.

According to various embodiments of the present disclosure, the processor may perform control so that the self-driving robot outputs, on the basis of the determination, second information indicating normal hand-over or third information indicating abnormal hand-over.

According to various embodiments of the present disclosure, the processor may perform control so that the self-driving robot performs authentication of the event operator before handing over the package.

According to various embodiments of the present disclosure, the loading box may include a first loading box corresponding to a first class, and a second loading box corresponding to a second class. The processor may perform control so that the self-driving robot opens the first loading box or the second loading box corresponding to the class of the take-over package and loads the take-over package. According to various embodiments of the present disclosure, the processor may perform control so that the self-driving robot induces event processing at the authorized area, in response to determining closing of the loading box.

According to various embodiments of the present disclosure, the processor may perform control so that the self-driving robot identifies, in response to entry into a specified area while moving along the moving path, at least one hand-over package to be handed over at the specified area, and the self-driving robot tracks the event operator in response to determining that the event operator for the hand-over package is absent at the specified area.

According to various embodiments of the present disclosure, a method of operating a self-driving robot includes:

identifying, in response to detecting a delivery event while moving along a moving path, delivery authority information and position information of an event operator; and determining, on the basis of the delivery authority information and the position information, whether to open a loading box of the self-driving robot. According to an embodiment, the delivery authority information may include information on an authorized area in which an event processing authority of the event operator is given.

According to various embodiments of the present disclosure, the delivery authority information may include an event processing authority of the event operator which is related to at least one among a package hand-over authority and a package take-over authority. The method of operating the self-driving robot may further include: performing control so as to hand over a package loaded in the loading box or load a take-over package in the loading box on the basis of the event processing authority, in response to determining opening of the loading box.

According to various embodiments of the present disclosure, the performing of control so as to hand over the package loaded in the loading box may include: performing control so as to provide first information indicating a position of a hand-over package loaded in the loading box, while handing over the package.

According to various embodiments of the present disclosure, the performing of control so as to hand over the package loaded in the loading box may include: performing control so as to provide, when a hand-over package related to the event operator is not loaded in the loading box, delivery information of the hand-over package.

According to various embodiments of the present disclosure, the performing of control so as to hand over the package loaded in the loading box may include: performing control so as to monitor a weight inside the loading box; and performing control so as to determine, on the basis of a result of the monitoring, whether a hand-over package loaded in the loading box is handed over normally.

According to various embodiments of the present disclosure, the performing of control so as to hand over the package loaded in the loading box may include: performing control so as to output, on the basis of the determination, second information indicating normal hand-over or third information indicating abnormal hand-over. According to various embodiments of the present disclosure, the performing of control so as to hand over the package loaded in the loading box may include: performing control so as to perform authentication of the event operator before handing over the package.

According to various embodiments of the present disclosure, the loading box may include a first loading box corresponding to a first class, and a second loading box corresponding to a second class. The performing of control so as to load the take-over package in the loading box may include: performing control so as to open the first loading box or the second loading box corresponding to the class of the take-over package and load the take-over package.

According to various embodiments of the present disclosure, the method of operating the self-driving robot may further include: performing control so as to induce event processing at the authorized area, in response to determining closing of the loading box. According to various embodiments of the present disclosure, the method of operating the self-driving robot may further include: performing control so as to identify, in response to entry into a specified area while moving along the moving path, at least one hand-over package to be handed over at the specified area; and performing control so as to track the event operator in response to determining that the event operator for the hand-over package is absent at the specified area.

The self-driving robot 400 and the method of operating the same according to embodiments of the present disclosure may be stored in a computer readable storage medium so as to be employed in instructions executable by the processor 450. The storage medium can include a database, including distributed database, such as a relational database, a non-relational database, an in-memory database, or other suitable databases, which can store data and allow access to such data via a storage controller, whether directly and/or indirectly, whether in a raw state, a formatted state, an organized stated, or any other accessible state. In addition, the storage medium can include any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

In certain implementations, a robot comprise: a bin including at least one loading space; a communication circuit configured to transmit or receive a signal; a first sensor configured to detect information regarding a surrounding environment; a motor configured to implement movement of the robot; and a processor configured to: identify delivery authority information and position information of an operator in response to detecting a delivery event while moving along a moving path, and determine whether to allow the operator to access the bin based on the delivery authority information and the position information, wherein the delivery authority information identifies an authorized area in which the operator is given authority to access to the bin.

The delivery authority information indicates whether the operator is authorized to hand-over or take-over an object, and the processor, when determining whether to open the bin, is further to manage the robot to hand-over the object to the operator or take-over the object from the user based on the delivery authority information. The processor, when managing the robot to hand-over the object to the operator, is further to output information indicating a position of object in the bin. The processor, when managing the robot to hand-over the object to the operator, is further to provide delivery information of the object to the operator when the object is not loaded in the bin.

The bin may include a second sensor configured to detect a weight of contents receive inside the bin, and the processor monitors the weight of the contents received inside the bin and determines based on the weight of the contents of the contents received inside the bin and when handing-over the object to the user, whether the object was removed from the bin. The processor outputs information indicating whether the operator obtained the object from the bin. The processor may perform authentication of the operator before handing-over the object to the operator.

The bin may include a first bin corresponding to a first class of packages, and a second bin corresponding to a second class of packages, and the processor, when managing the robot to take-over the object from the user, opens one of the first bin or the second bin corresponding to a class of the object from the user.

The processor may induce event processing at the authorized area when the bin is closed. The processor may identify, when the robot enters a specified area while moving along the moving path, at least one object to be handed over at the specified area to a particular operator, and determines a location of the particular operator when the particular operator is absent from the specified area.

In some implementations, a method of operating a robot may comprise: identifying, in response to detecting a delivery event while moving along a moving path, delivery authority information and position information of an operator; and determining, based on the delivery authority information and the position information, whether to allow the operator to access a bin of the robot, wherein the delivery authority information identifies an authorized area in which the operator is given authority to access the bin.

The delivery authority information identifies whether to hand-over an object to the operator or to take-over the object from the user, and the method may further comprise handing-over the object to the operator or taking-over the object from the operator based on the delivery authority information in response to determining to open the bin.

Handing-over the object includes: providing information identifying a position of the object in the bin. Handing-over the object may include: providing, when the object is not loaded in the bin, delivery information of the object to the operator.

Handing-over the object includes: monitoring a weight of contents inside the bin; and determining, based on the weight of the contents inside the bin, whether the object was removed from the bin by the operator. The method may further comprise outputting information indicating whether the hand-over of the object to the operator was successfully completed. Handing-over the object to the operator may include: performing authentication of the operator before enabling the operator to acquire the object from the bin.

The bin may include a first bin corresponding to a first class, and a second bin corresponding to a second class, and taking-over the object from the operator may include: opening one of the first bin or the second bin corresponding to a class of object and a load associated with the object.

The method may further comprise: performing event processing at the authorized area, when the bin is closed. The method may further comprise: identifying, in response to the robot entering a specified area while moving along the moving path, at least one object to be handed over at the specified area; and determining a location of a particular operator in response to determining that the particular operator for the at least one object is absent from the specified area.

According to embodiments of the present disclosure, there is provided a self-driving robot including: a loading box including at least one loading space; a communication circuit configured to transmit and receive a signal; an information collection device configured to detect a surrounding environment; a driving device configured to implement movement of the self-driving robot; and a processor configured to control the loading box, the communication circuit, and the information collection device, wherein the processor performs control so that the self-driving robot identifies delivery authority information and position information of an event operator, in response to detecting a delivery event while moving along a moving path, and the self-driving robot determines whether to open the loading box, on the basis of the delivery authority information and the position information.

According to embodiments of the present disclosure, there is provided a method of operating a self-driving robot, the method including: identifying, in response to detecting a delivery event while moving along a moving path, delivery authority information and position information of an event operator; and determining, on the basis of the delivery authority information and the position information, whether to open a loading box of the self-driving robot, wherein the delivery authority information includes information on an authorized area in which an event processing authority of the event operator is given.

According to embodiments of the present disclosure, the self-driving robot determines whether to open the loading box, on the basis of the user's authority and the current position of the self-driving robot, whereby in addition to the pre-designated delivery point, the package is received or given at another position. In addition, according to embodiments of the present disclosure, the self-driving robot determines whether to hand over the package through recipient authentication, in hand-over of the package, thereby solving the problem that the transported package is received by someone other than the recipient or is lost.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   a bin including a plurality of loading boxes;
   a communication circuit configured to transmit or receive a signal;
   a first sensor configured to detect information regarding a surrounding environment;
   a motor configured to implement movement of the robot; and
   a processor configured to:
      detect a delivery event by interaction with an operator while moving along a moving path;
      identify delivery authority information and position information of the operator in response to detecting the delivery event, and
      determine whether to allow the operator to access the bin based on the delivery authority information and the position information,
   wherein the delivery authority information identifies an authorized area in which the operator is given authority to access to the bin,
   wherein the processor is further configured to:
      when the delivery event is a package take-over event for receiving an object from the operator, acquire delivery class information indicating whether an authentication of a recipient is required when delivering the object to the recipient,
      select, based on the acquired delivery class information, one of a first loading box, of the plurality of loading boxes, associated with a first delivery class or a second loading box of the plurality of loading boxes, associated with a second delivery class,
      open the selected one of the first loading box or the second loading box to take over the object from the operator, and
      when the delivery event is a package hand-over event for delivering the object to the operator, determine whether the object related to the operator is loaded in the bin, and provide delivery information of the object to the operator when the object is not loaded in the bin, and
   wherein the delivery information includes estimated arrival time of another robot loaded with the object related to the operator.

2. The robot of claim 1, wherein the delivery authority information indicates whether the operator is authorized to hand-over or take-over the object, and
   the processor, when determining whether to allow the operator to access the bin, is further configured to manage the robot to hand-over the object to the operator or take-over the object from the operator based on the delivery authority information.

3. The robot of claim 2, wherein the processor, when managing the robot to hand-over the object to the operator, is further configured to output information indicating a position of the object in the bin.

4. The robot of claim 2, wherein the bin includes a second sensor configured to detect a weight of contents receive inside the bin, and
   the processor monitors the weight of contents received inside the bin and determines based on monitoring the weight of the contents received inside the bin and when handing-over the object to the operator, whether the object was removed from the bin.

5. The robot of claim 4, wherein the processor outputs information indicating whether the operator obtained the object from the bin.

6. The robot of claim 2, wherein the processor performs authentication of the operator before handing-over the object to the operator.

7. The robot of claim 1, wherein the first loading box of the first delivery class is a loading box that requires the recipient's authentication upon delivery of the object, and
   the second loading box of the second delivery class is a loading box that does not require the recipient's authentication upon delivery of the object.

8. The robot of claim 1, wherein the processor induces event processing at the authorized area when the bin is closed.

9. The robot of claim 1, wherein the processor identifies, when the robot enters a specified area while moving along the moving path, at least one object to be handed over at the specified area to a particular operator, and determines a location of the particular operator when the particular operator is absent from the specified area.

10. A method of operating a robot, the method comprising:
    detecting a delivery event by interaction with an operator while moving along a moving path;
    identifying, in response to detecting the delivery event, delivery authority information and position information of an operator; and
    determining, based on the delivery authority information and the position information, whether to allow the operator to access a bin of the robot, wherein the delivery authority information identifies an authorized area in which the operator is given authority to access the bin, wherein determining whether to allow the operator to access bin of the robot includes:

when the delivery event is a package take-over event for receiving an object from the operator, acquiring delivery class information indicating whether authentication of a recipient is required when delivering of the object to the recipient;

selecting, based on the acquired delivery class information, one of a first loading box associated with a first delivery class or a second loading box associated with a second delivery class;

opening the selected one of the first loading box or the second loading box to take over the object from the operator; and when the delivery event is a package hand-over event for delivering the object to the operator, determining whether e object related to the operator is loaded in the bin; and providing, when the object is not loaded in the bin, delivery information of the object to the operator, and wherein the delivery information includes an estimated arrival time of another robot loaded with the object related to the operator.

11. The method of claim 10, wherein the delivery authority information identifies whether to hand-over an object to the operator or to take-over the object from the operator, and the method further comprises handing-over the object to the operator or taking-over the object from the operator based on the delivery authority information in response to determining whether to allow the operator to access the bin.

12. The method of claim 11, wherein handing-over the object comprises:
providing information identifying a position of the object in the bin.

13. The method of claim 11, wherein handing-over the object comprises:
monitoring a weight of contents inside the bin; and
determining, based on the weight of the contents inside the bin, whether the object was removed from the bin by the operator.

14. The method of claim 13, further comprising outputting information indicating whether the hand-over of the object to the operator was successfully completed.

15. The method of claim 11, wherein handing-over the object to the operator comprises:
performing authentication of the operator before enabling the operator to acquire the object from the bin.

16. The method of claim 11, wherein the first loading box of the first delivery class is a loading box that requires the recipient's authentication upon delivery of the object, and the second loading box of the second delivery class is a loading box that does not require the recipient's authentication upon delivery of the object.

17. The method of claim 10, further comprising:
performing event processing at the authorized area, when the bin is closed.

18. The method of claim 10, further comprising:
identifying, in response to the robot entering a specified area while moving along the moving path, at least one object to be handed over at the specified area; and
determining a location of a particular operator in response to determining that the particular operator for the hand-over of the at least one object is absent from the specified area.

* * * * *